United States Patent
Rottman et al.

(10) Patent No.: US 10,625,485 B2
(45) Date of Patent: Apr. 21, 2020

(54) POLYMERIC RULE DIE, AND FORMULATIONS THEREFOR

(71) Applicant: HIGHCON SYSTEMS LTD., Yavne (IL)

(72) Inventors: Claudio Rottman, Modiin (IL); Natalia Zlotnikov, Petach Tikva (IL)

(73) Assignee: Highcon Systems Ltd., Yavne (IL)

( * ) Notice: Subject to any disclaimer, the term of this patent is extended or adjusted under 35 U.S.C. 154(b) by 313 days.

(21) Appl. No.: 15/129,421

(22) PCT Filed: Apr. 7, 2015

(86) PCT No.: PCT/IB2015/052513
§ 371 (c)(1),
(2) Date: Sep. 27, 2016

(87) PCT Pub. No.: WO2015/155685
PCT Pub. Date: Oct. 15, 2015

(65) Prior Publication Data
US 2017/0113432 A1    Apr. 27, 2017

(30) Foreign Application Priority Data

Apr. 7, 2014 (GB) .................................. 1406197.2

(51) Int. Cl.
| | | |
|---|---|---|
| C08F 2/46 | (2006.01) |
| C08F 2/50 | (2006.01) |
| C08G 61/04 | (2006.01) |
| B31F 1/10 | (2006.01) |
| B29C 48/03 | (2019.01) |
| B31B 50/25 | (2017.01) |
| B29L 31/00 | (2006.01) |

(52) U.S. Cl.
CPC ............... B31F 1/10 (2013.01); B29C 48/03 (2019.02); *B29L 2031/757* (2013.01); *B31B 50/256* (2017.08)

(58) Field of Classification Search
CPC .. B31F 1/10; B29L 2031/757; B29C 47/0009; C08F 2/46; C08F 2/50
USPC ....................... 522/6, 71, 189, 184, 1; 520/1
See application file for complete search history.

(56) References Cited

U.S. PATENT DOCUMENTS

| | | | |
|---|---|---|---|
| 3,470,773 A | 10/1969 | Mueller | |
| 7,670,275 B2 | 3/2010 | Schaack | |
| 2011/0294913 A1* | 12/2011 | Zimmer | .................. C08L 23/02 522/157 |
| 2012/0065336 A1* | 3/2012 | Mizori | ..................... C08K 5/37 525/301 |
| 2012/0122648 A1 | 5/2012 | Zimmer et al. | |
| 2012/0129672 A1 | 5/2012 | Zimmer et al. | |
| 2015/0105232 A1 | 4/2015 | Zimmer et al. | |

FOREIGN PATENT DOCUMENTS

| | | |
|---|---|---|
| CN | 102985612 | 3/2013 |
| EP | 1484369 A1 | 12/2004 |
| FR | 2996232 A1 | 4/2014 |
| JP | 2003-039390 | 2/2003 |
| JP | 2013-533327 | 8/2013 |
| WO | 2011/145092 A2 | 11/2011 |
| WO | 2013/030828 A2 | 3/2013 |

OTHER PUBLICATIONS

International Search Report for PCT/IB2015/052513, search report dated Jul. 14, 2015.
Written Opinion for PCT/IB2015/052513, written opinion dated Jul. 14, 2015.

* cited by examiner

*Primary Examiner* — Jessica Whiteley
(74) *Attorney, Agent, or Firm* — Daniel Feigelson; Fourth Dimension IP

(57) ABSTRACT

Die and counter-die systems, polymeric rule dies for such systems, and polymeric formulations suitable for producing such rule dies using digital rule writing. There is provided a rule die for pressure-contacting of a cardboard workpiece surface, including: (a) a die body; and (b) at least one elongate polymeric rule, each rule having: (i) a first elongate base surface adhesively attached to a surface of the die body; and (ii) an elongate protrusion, distally protruding from the die body, the elongate protrusion having an elongate die surface, the elongate die surface including a polymeric material, the elongate die surface having a contact surface adapted to contact the workpiece surface; the contact surface having a length of at least 5 mm and a first width (W) within a range of 0.4 to 1.0 mm, the rule having a height (H) within a range of 1.0 to 4.5 mm; wherein, over a total length of the contact surface, the contact surface having at most 5 surface pocks/meter, the pocks having a diameter above 0.1 mm.

14 Claims, 20 Drawing Sheets

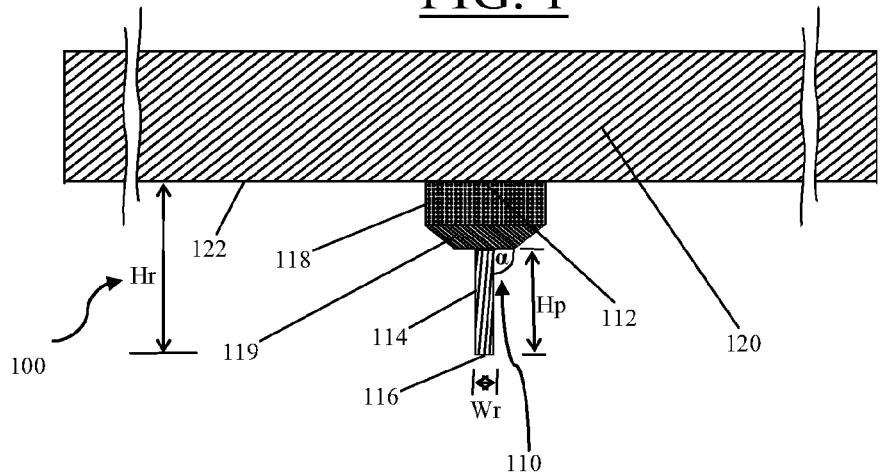
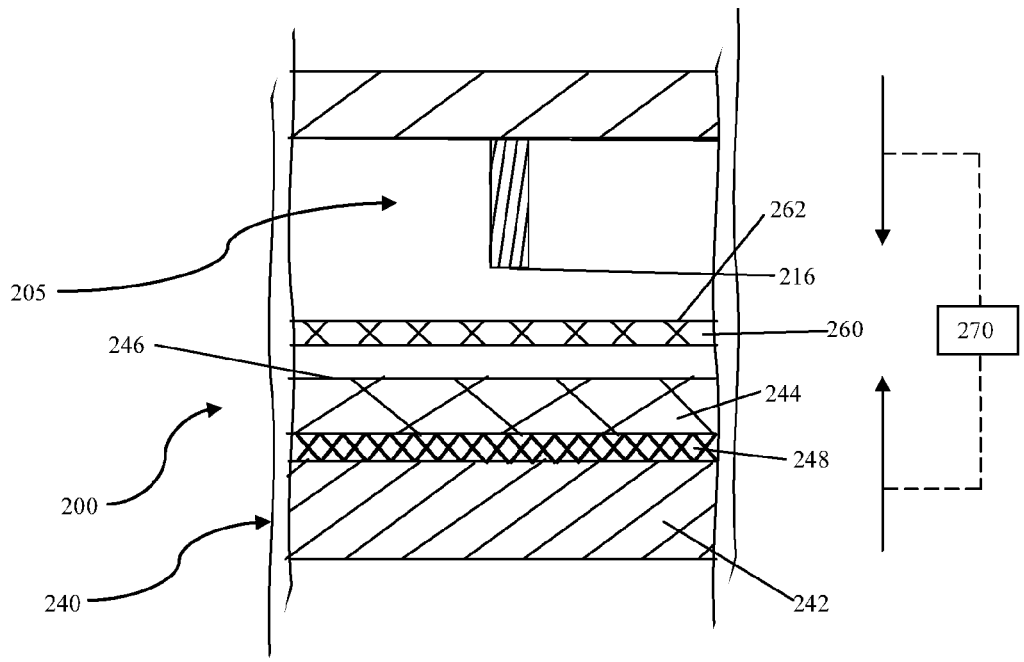

| Sample number | Before creasing | rule height (Before creasing) | After creasing | rule height (After creasing) | Crease line |
|---|---|---|---|---|---|
| EXAMPLE 1 | | 1.55 | | 1.55 | |
| EXAMPLE 9 | | 1.54 | | 1.41 | |
| EXAMPLE 7 | | 1.55 | | 1.55 | |
| EXAMPLE 4 | | 1.65 | | 1.57 | |
| EXAMPLE 2 | | 1.29 | | 1.29 | |
| EXAMPLE 6 | | 1.68 | | 1.68 | |

FIG. 18

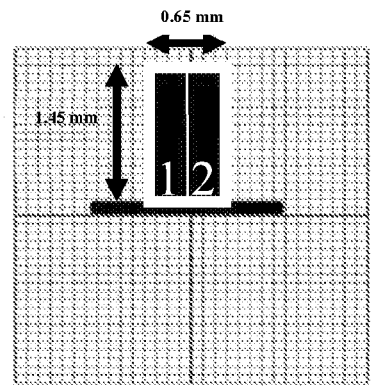
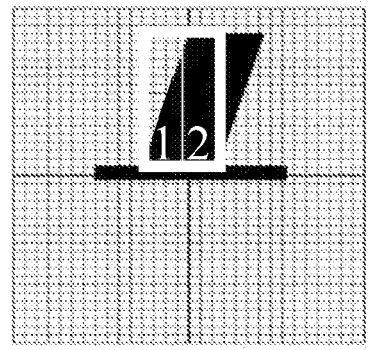
FIG. 19A     FIG. 19B
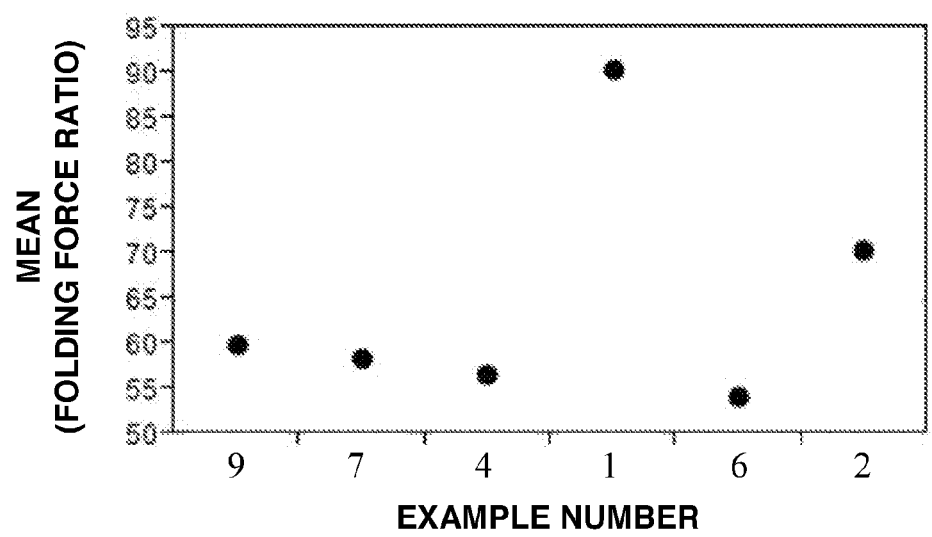
FIG. 20

POLYMERIC RULE DIE, AND FORMULATIONS THEREFOR

This application draws priority from UK Patent Application No. 1406197.2, filed Apr. 7, 2014 and entitled "Polymeric Rule Die, and Formulations Therefor", which application hereby incorporated by reference, as if fully disclosed herein.

FIELD AND BACKGROUND OF THE INVENTION

The present invention relates to die and counter-die systems, to polymeric rule dies for such systems, and to polymeric formulations suitable for producing such rule dies using digital rule writing.

The present inventors have recognized a need for improved polymeric rule dies, and for improved formulations for producing such polymeric rule dies.

SUMMARY OF THE INVENTION

According to certain teachings of the present invention there is provided a rule die for pressure-contacting of a cardboard workpiece surface, including: (a) a die body; and (b) at least one elongate polymeric rule, each rule having: (i) a first elongate base surface adhesively attached to a surface of the die body; and (ii) an elongate protrusion, distally protruding from the die body, the elongate protrusion having an elongate die surface, the elongate die surface including a polymeric material, the elongate die surface having a contact surface adapted to contact the workpiece surface; the contact surface having a length of at least 5 mm and a first width (W) within a range of 0.4 to 1.0 mm, the rule having a height (H) within a range of 1.0 to 4.5 mm; wherein, over a total length of the contact surface, the contact surface having at most 5 surface pocks/meter, the pocks having a diameter above 0.1 mm.

According to another aspect of the present invention there is provided a rule die for pressure-contacting cardboard workpiece surface, including: (a) a die base; and (b) at least one elongate rule, each rule having: (i) a first elongate base surface adhesively attached to a surface of the die base; and (ii) an elongate protrusion, distally protruding from the die base, the elongate protrusion having an elongate die surface, the elongate die surface including a polymeric material, the elongate die surface having a contact surface adapted to contact the workpiece surface; the contact surface having a length of at least 5 mm, the rule having at least one of the following:
(1) a first width W within a range of 0.4 to 0.65 mm, the rule having a height H within a range of 1.0 to 4.5 mm; (2) a first width W within a range of 0.4 to 0.65 mm, and a height H such that the ratio of W to H is within a range of 0.2 to 0.8; (3) at least one of the following strain-stress ($\varepsilon$–$\sigma$) properties at 25° C.: a stress at yield within a range of 1.4 to 5.1 MPa; a strain at yield within a range of 0.18 to 1.65%; a Young's modulus within a range of 290 to 710 MPa; a stress at maximum load within a range of 2.8 to 26 MPa; a strain at break within a range of 2.8 to 52%; and a cumulative energy to the break within a range of 0.14 to 1.61; (4) following a standard deformation procedure, a standard crease produced by the rule die exhibits a mean folding force ratio of at most 0.65; and (5) following a standard deformation procedure, the elongate rule exhibits a deformation asymmetry of at most 0.6.

According to yet another aspect of the present invention there is provided a pre-polymeric formulation including: (a) at least one pre-polymer; (b) an activator selected to polymerize the pre-polymer, the activator being mixed with the pre-polymer.

According to yet another aspect of the present invention there is provided a method of writing a pre-polymeric formulation on a substrate, to produce a polymeric rule die, including: (a) providing a pre-polymeric formulation in a canister; the formulation including: (i) at least one pre-polymer; (ii) a photoinitiator selected to polymerize the pre-polymer; and (iii) a thickening agent; (b) extruding the formulation from the canister onto the substrate, to form at least one uncured elongate rule; and (c) curing the uncured elongate rule on the substrate to form the polymeric rule die, the rule die including at least one cured elongate rule having a length of at least 5 mm; the pre-polymeric formulation in the canister containing a sufficiently low gas concentration, such that at least one of the following structural properties is achieved: (1) over a total length of a contact surface of the cured elongate rule, the contact surface has at most 5 surface pocks/meter, the surface pocks having a diameter above 0.1 mm; and (2) over a total length of the cured elongate rule, a bubble content of bubbles having a diameter above 0.4 mm is at most 2 bubbles/meter.

According to further features in the described preferred embodiments, the formulation has the following rheological properties at 25° C.:
(i) $G'_{rest} > 3{,}000$ Pascal (Pa);
(ii) $G'$ exhibits a value of at least 2,500 Pa after being subjected to an oscillation stress of 300 Pa for 20 seconds, within 7 seconds of an abrupt relaxation of the stress,
$G'$ being a storage modulus of the formulation;
$G'_{rest}$ being a storage modulus of the formulation at a pressure of 40 Pa, at rest.

According to yet another aspect of the present invention there is provided a pre-polymeric formulation for producing a rule die, the formulation including: (a) at least one pre-polymer; (b) a photoinitiator selected to polymerize the pre-polymer; and (c) a thickening agent; the photoinitiator and the thickening agent being mixed with the pre-polymer, the formulation having the following rheological properties at 25° C.:
(i) $G'_{rest} > 3{,}000$ Pascal (Pa);
(ii) $G'$ exhibits a value of at least 2,500 Pa after being subjected to an oscillation stress of 300 Pa for 20 seconds, within 7 seconds of an abrupt relaxation of the stress,
$G'$ being a storage modulus of the formulation;
$G'_{rest}$ being a storage modulus of the formulation at a pressure of 40 Pa, at rest; the formulation fulfilling at least one of the following structural properties:
(1) after standard curing of the formulation, and after a standard deformation procedure, the rule die exhibits a deformation asymmetry of at most 0.6;
(2) after standard curing of the formulation, and after a standard deformation procedure, a standard crease produced by the rule die exhibits a mean folding force ratio of at most 0.65, at most 0.62, at most 0.60, at most 0.59, at most 0.58, at most 0.57, or at most 0.56.
(3) the formulation has a baseline density $\rho_{baseline}$, a bulk density $\rho_{bulk}$, and a differential density $\Delta\rho$, the differential density defined by:

$$\Delta\rho = \rho_{baseline} - \rho_{bulk}$$

the differential density being at least 0.01;

(4) a cured formulation is obtained by standard curing of the formulation, the cured formulation having at least one of the following strain-stress (ε–σ) properties at 25° C.:
(i) a stress at yield within a range of 1.4 to 5.1 MPa;
(ii) a strain at yield within a range of 0.18 to 1.65%;
(iii) a Young's modulus within a range of 290 to 710 MPa;
(iv) a stress at maximum load within a range of 2.8 to 26 MPa;
(v) a strain at break within a range of 2.8 to 52%; and
(vi) a cumulative energy to the break within a range of 0.14 to 1.6 J;
(5) the thickening agent includes a three-dimensional network former.

According to further features in the described preferred embodiments, each rule is an extrudate.

According to still further features in the described preferred embodiments, the base surface has a second width exceeding the first width by at least 0.1 mm.

According to still further features in the described preferred embodiments, the at least one elongate rule including a plurality of elongate rules.

According to still further features in the described preferred embodiments, over a total length of the elongate rule, a bubble content of bubbles having a diameter above 0.4 mm is at most 2 bubbles/meter, at most 1.5 bubbles/meter, at most 1 bubble/meter, at most 0.7 bubbles/meter, at most 0.5 bubbles/meter, at most 0.4 bubbles/meter, or at most 0.3 bubbles/meter.

According to still further features in the described preferred embodiments, following a standard deformation procedure, the elongate rule exhibits a deformation asymmetry of at most 0.55, at most 0.4, at most 0.3, at most 0.25, at most 0.2, at most 0.15, at most 0.10, or at most 0.05.

According to still further features in the described preferred embodiments, following a standard deformation procedure performed on the rule die, a standard crease produced by the rule die exhibits a mean folding force ratio of at most 0.64, at most 0.62, at most 0.60, at most 0.59, at most 0.58, at most 0.57, or at most 0.56, and typically, at least 0.40, at least 0.42, at least 0.44, at least 0.46, at least 0.48, or at least 0.50.

According to still further features in the described preferred embodiments, following a standard deformation procedure, a standard crease produced by the rule die exhibits a mean folding force ratio within a range of 0.40 to 0.64, 0.40 to 0.62, 0.40 to 0.60, or 0.40 to 0.58.

According to still further features in the described preferred embodiments, over a total length of the contact surface, the contact surface has at most 4.5 surface pocks/meter, at most 4 pocks/meter, at most 3 pocks/meter, at most 2 pocks/meter, at most 1.5 pocks/meter, at most 1 pock/meter, at most 0.8 pocks/meter, at most 0.6 pocks/meter, at most 0.4 pocks/meter, or at most 0.3 pocks/meter, the pocks having a diameter above 0.1 mm.

According to still further features in the described preferred embodiments, the elongate rule, or a cured formulation obtained by standard curing of the formulation, has at least one of the following strain-stress (ε–σ) properties at 25° C.: (i) a stress at yield within a range of 1.4 to 5.1 MPa; (ii) a strain at yield within a range of 0.18 to 1.65%; (iii) a Young's modulus within a range of 290 to 710 MPa; (iv) a stress at maximum load within a range of 2.8 to 26 MPa; (v) a strain at break within a range of 2.8 to 52%; and (vi) a cumulative energy to the break within a range of 0.14 to 1.61

According to still further features in the described preferred embodiments, the Young's modulus is within a range of 290 to 710 MPa, and the strain at break is within a range of 2.8 to 52%; more preferably, the strain at break is within a range of 13 to 30%; yet more preferably, the Young's modulus is within a range of 290 to 600 MPa, and the strain at break is within a range of 16 to 26%.

According to still further features in the described preferred embodiments, the contact surface has a length of at least 5 mm and a first width W within a range of 0.4 to 0.65 mm, the base surface having a second width exceeding the first width by at least 0.1 mm, the rule having a height H within a range of 1.0 to 4.5 mm.

According to still further features in the described preferred embodiments, the range of the first width is 0.4 to 0.62 mm, 0.4 to 0.60 mm, 0.4 to 0.58 mm, 0.4 to 0.56 mm, 0.4 to 0.54 mm, 0.4 to 0.52 mm, 0.4 to 0.50 mm, 0.4 to 0.48 mm, or 0.4 to 0.46 mm.

According to still further features in the described preferred embodiments, the range of the height is 1.2 to 4.5 mm, 1.4 to 4.5 mm, 1.6 to 4.5 mm, 1.7 to 4.5 mm, 1.8 to 4.5 mm, 1.2 to 4 mm, 1.2 to 3.5 mm, 1.2 to 3 mm, 1.2 to 2.5 mm, 1.2 to 2 mm, 1.2 to 1.8 mm, or 1.2 to 1.6 mm.

According to still further features in the described preferred embodiments, a ratio of W to H is within a range of 0.2 to 0.75, 0.2 to 0.7, 0.2 to 0.65, 0.2 to 0.6, 0.2 to 0.55, 0.2 to 0.5, 0.2 to 0.45, 0.25 to 0.6, 0.3 to 0.6, 0.3 to 0.55, or 0.3 to 0.5.

According to still further features in the described preferred embodiments, the rule die exhibits a Shore D hardness of at least 55, at least 57, at least 60, at least 62, at least 64, at least 66, at least 68, at least 70, at least 72, at least 74, or at least 76, and typically, at most 90, at most 88, at most 86, or at most 84.

According to still further features in the described preferred embodiments, the surface of the die base includes a broad surface of a film, the film having a thickness of 25 to 500 micrometers.

According to still further features in the described preferred embodiments, the film has a thickness of at least 40 micrometers, at least 60 micrometers, at least 100 micrometers, at least 150 micrometers, at least 200 micrometers, at least 250 micrometers, at least 300 micrometers, at least 350 micrometers, or at least 400 micrometers.

According to still further features in the described preferred embodiments, the film has a thickness of at most 450 micrometers, at most 400 micrometers, at most 350 micrometers, or at most 300 micrometers.

According to still further features in the described preferred embodiments, the film is a polymeric film or a metallic film.

According to still further features in the described preferred embodiments, a concentration of the three-dimensional network former within the formulation is 5 to 30%, 6 to 30%, 7 to 30%, 8 to 30%, 8 to 25%, or 8 to 22%, by weight According to still further features in the described preferred embodiments, the differential density is at least 0.015, at least 0.02, at least 0.025, at least 0.03, at least 0.04, or at least 0.05.

According to still further features in the described preferred embodiments, the thickening agent includes, predominantly includes, or consisting essentially of a thixotropic agent.

According to still further features in the described preferred embodiments, the pre-polymer and thickening agent are selected such that G' attains the value of at least 2,500 Pa at 25° C., within 5 seconds, within 4 seconds, within 3 seconds, within 2 seconds, within 1 second, within 0.5 seconds, within 0.3 seconds, within 0.1 seconds, within 0.02 seconds, or within 0.005 seconds of the relaxation.

According to still further features in the described preferred embodiments, the formulation is a thixotropic formulation having a structural property such that, after the relaxation in which the motion has been curtailed, the value of G' increases to at least 2,500 Pa at 25° C., within 5 seconds, within 4 seconds, within 3 seconds, within 2 seconds, or within 1 second of the relaxation.

According to still further features in the described preferred embodiments, this value is, at 25° C., at least 2,750 Pa, at least 3,000 Pa, at least 3,250 Pa, at least 3,500 Pa, at least 3,750 Pa, at least 4,000 Pa, at least 4,250 Pa, at least 4,500 Pa, at least 4,750 Pa, at least 5,000 Pa, at least 5,500 Pa, at least 6,000 Pa, at least 7,000 Pa, at least 8,000 Pa, at least 9,000 Pa, at least 10,000 Pa, at least 11,000 Pa, or at least 12,000 Pa.

According to still further features in the described preferred embodiments, G'rest exceeds G', during the oscillation stress, by at least 100 Pa, at least 200 Pa, at least 300 Pa, at least 500 Pa, at least 1,000 Pa, at least 1,500 Pa, at least 2,000 Pa, at least 3,000 Pa, at least 5,000 Pa, at least 7,000 Pa, at least 10,000 Pa, at least 20,000 Pa, at least 35,000 Pa, or at least 50,000 Pa.

According to still further features in the described preferred embodiments, the pre-polymer is a thermosetting pre-polymer.

According to still further features in the described preferred embodiments, the at least one pre-polymer includes a monomer or an oligomer, having at least one functional moiety selected from the group consisting of acrylic, vinyl, thiol, and epoxy moieties.

According to still further features in the described preferred embodiments, the formulation includes at least one polymerization inhibitor.

According to still further features in the described preferred embodiments, the inhibitor includes a glycerol.

According to still further features in the described preferred embodiments, the inhibitor includes a propoxylated glycerol.

According to still further features in the described preferred embodiments, the inhibitor includes a benzophenone.

According to still further features in the described preferred embodiments, the thickening agent includes, predominantly includes, or consists essentially of an amorphous silica.

According to still further features in the described preferred embodiments, the thickening agent includes, predominantly includes, or consists essentially of a fumed amorphous silica.

According to still further features in the described preferred embodiments, the thickening agent includes 5 to 30%, 6 to 30%, 7 to 30%, 8 to 30%, 8 to 25%, or 8 to 22% of a three-dimensional network former.

According to still further features in the described preferred embodiments, the thickening agent includes 5 to 30%, 6 to 30%, 7 to 30%, 8 to 30%, 8 to 25%, 8 to 22%, 9 to 25%, 9 to 22%, 9 to 20%, 9 to 18%, 9 to 16%, 10 to 16%, or 11 to 16% of an amorphous silica.

According to still further features in the described preferred embodiments, the at least one pre-polymer includes at least one acrylate, the formulation including 27 to 86%, 31 to 84%, 34 to 81%, 37 to 79%, 41 to 76%, 45 to 79%, 48 to 79%, 52 to 79%, 56 to 79%, 59 to 79%, or 62 to 79% thereof.

According to still further features in the described preferred embodiments, the at least one acrylate includes isobornyl acrylate and an aliphatic urethane methacrylate.

According to still further features in the described preferred embodiments, the formulation further includes an acrylated oligoamine resin.

According to still further features in the described preferred embodiments, the concentration of acrylated oligoamine resin is at least 3%, at least 5%, at least 7%, at least 8%, or at least 9%.

According to still further features in the described preferred embodiments, the concentration of acrylated oligoamine resin is at most 25%, at most 21%, at most 18%, at most 16%, or at most 14%.

According to still further features in the described preferred embodiments, a rule die, produced by standard curing of the formulation, exhibits a Shore D hardness of at least 55, at least 57, at least 60, at least 62, at least 64, at least 66, at least 68, at least 70, at least 72, at least 74, or at least 76, and typically, at most 90, at most 88, at most 86, at most 84, or at most 82.

According to still further features in the described preferred embodiments, a standard crease produced by a rule die cured by standard curing of the formulation, after the rule die has been subjected to a standard deformation procedure, exhibits a mean folding force ratio of at most 0.65, at most 0.62, at most 0.60, at most 0.59, at most 0.58, at most 0.57, or at most 0.56, and typically, at least 0.40, at least 0.42, at least 0.44, at least 0.46, at least 0.48, or at least 0.50.

According to still further features in the described preferred embodiments, the at least one pre-polymer includes at least one oligomer.

According to still further features in the described preferred embodiments, the at least one pre-polymer includes at least one monomer.

According to still further features in the described preferred embodiments, the at least one pre-polymer includes at least a second oligomer.

According to still further features in the described preferred embodiments, after standard curing of the formulation to produce a cured formulation, a glass transition temperature of the cured formulation is within a range of 30-80° C., 40-70° C., 50-65° C., or 50-60° C.

According to still further features in the described preferred embodiments, the thickening agent includes, predominantly includes, or consists essentially of a three-dimensional network former.

According to still further features in the described preferred embodiments, the network former includes, predominantly includes, or consists essentially of silica.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings:

FIG. 1 provides a schematic, cross-sectional view of a rule die having an elongate rule;

FIG. 2 provides a schematic, partially cross-sectional view of an exemplary surface mounted rule die system including a rule die that may be functionally similar to the rule die of FIG. 1;

FIG. 18 provides images of rules produced from the formulations of Examples 1, 9, 7, 4, 2 and 6, before and after the deformation procedure was conducted thereupon;

FIG. 19A provides a schematic view of a rule cross-section after being cut to a rectangular profile, according to the standard deformation procedure; FIG. 19B provides a schematic view of this rule cross-section, after concluding the writing portion of the procedure;

FIG. 20 graphically provides the mean folding force ratio for standard creases made by rules produced from the formulations of Examples 1, 9, 7, 4, 2 and 6;

DETAILED DESCRIPTION

Figure 1A:
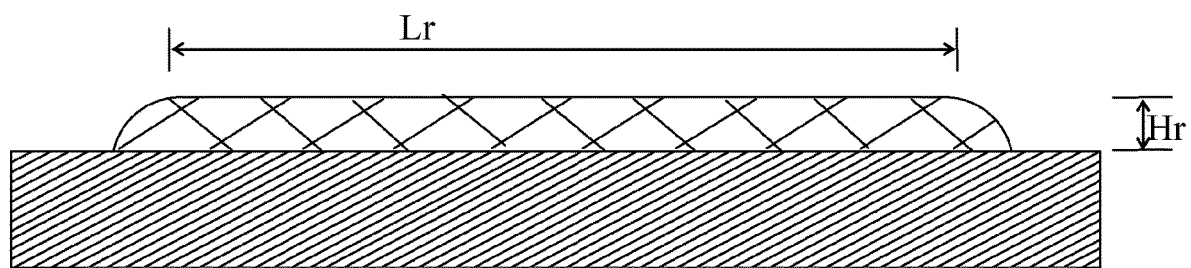
FIG. 1A provides a schematic, transverse cross-sectional view of the rule die of FIG. 1.

The principles and operation of the polymeric rule die technology according to the present invention may be better understood with reference to the drawings and the accompanying description.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIG. 1 provides a schematic, cross-sectional view of a rule die 100 having at least one elongate rule 110 having an elongate surface 112 adhesively attached to a broad surface 122 of a die base 120. Elongate rule 110 has an elongate protrusion 114 distally protruding from die base 120, elongate protrusion 114 having an elongate die surface 116. Typically, elongate rule 110, and more particularly, elongate die surface 116, predominantly include at least one polymeric material.

Elongate protrusion 114 may be directly adherent to die base 120. In some embodiments, however, elongate surface 112 is appreciably broader than elongate die surface 116, and forms a portion of elongate rule base 118. Elongate rule 110 may have a tapered segment 119 connecting between elongate protrusion 114 and elongate rule base 118. In some embodiments, tapered segment 119 may be extremely small or non-existent, as elongate protrusion 114 and elongate rule base 118 meet at an angle α of 90°, ±15°, ±10°, ±7°, ±5°, or ±3°. Typically the angle is at least 90°.

From the transverse cross-sectional view of rule die 100 provided in FIG. 1A, it will be appreciated that the length (Lr) of die surface 116 of elongate rule 110 is appreciably greater than the height of the rule, Hr.

With reference now to FIG. 1 as well, the width (Wr) of the rule, proximate to the contact or die surface 116 (towards the rule "tip"), may be a fraction of Hr. In some embodiments, a ratio of Wr to Hr may be within a range of 0.2 to 0.8, 0.2 to 0.75, 0.2 to 0.7, 0.2 to 0.6, 0.2 to 0.5, 0.2 to 0.45, 0.2 to 0.4, 0.2 to 0.35, 0.2 to 0.32, 0.2 to 0.3, 0.25 to 0.38, 0.25 to 0.36, or 0.28 to 0.38.

In some embodiments, length Lr of die surface 116 may be at least 5 mm, at least 7 mm, or at least 10 mm.

In some embodiments, width (Wr) may be at most 0.65 mm, and more typically, within a range of 0.35 to 0.65 mm, 0.4 to 0.65 mm, 0.42 to 0.65 mm, or 0.45 to 0.65 mm.

In some embodiments, elongate surface 112 may have a base width Wb exceeding Wr by at least 0.1 mm, and more typically, by at least 0.20 mm, by at least 0.25 mm, or by at least 0.5 mm, and typically, by at most 2 mm, at most 1.8 mm, at most 1.6 mm, at most 1.5 mm, or at most 1.4 mm.

In some embodiments, the ratio of Wb to Wr may be at most 4, at most 3.5, at most 3.2, at most 3.0, at most 2.8, or at most 2.6.

In some embodiments, Hr may be within a range of 1 to 4.5 mm, 1.7 to 4.5 mm, 1.8 to 4.5 mm, 1.9 to 4.5 mm, 2 to 4.5 mm, 2.2 to 4.5 mm, 2.5 to 4.5 mm, or 3 to 4.5 mm.

In some embodiments, Hp, the height of elongate protrusion 114, may be within a range of 0.8 to 4.5 mm, 1.0 to 4.5 mm, 1.4 to 4.5 mm, 1.6 to 4.5 mm, 1.8 to 4.5 mm, 1.9 to 4.5 mm, 2 to 4.5 mm, 2.2 to 4.5 mm, 2.5 to 4.5 mm, or 3 to 4.5 mm.

The inventors believe that contact surface widths (Wr) below 0.7 mm are unknown. Similarly, low ratios of Wr to Hr may also be unknown. As used herein in the specification and in the claims section that follows, the term "contact surface width", "rule width proximate to the contact or die surface 116", "Wr" and the like, refer to the broadest width of the rule within 0.3 mm of the tip of the rule.

Without wishing to be bound by theory, the inventors believe that the need for the rule to withstand high pressure delivered to the contact surface, along with, in many cases, rotational forces delivered to the long side of the rule, in combination with many other constraints (many of which will be discussed below), have heretofore precluded the advent of such-dimensioned rules.

FIG. 2 provides a schematic, partially cross-sectional view of an exemplary surface mounted rule die system 200 including a rule die 205 that may be functionally similar or identical to rule die 100 of FIG. 1. Disposed generally opposite rule die 205, and generally opposite an elongate die surface 216, is a counter-die 240, which may have a broad counter-die surface 242 facing elongate die surface 216.

Counter-die 240 may be multi-layered. In the exemplary embodiment provided in FIG. 2, counter-die 240 includes a counter-die base 242 such as a rotating drum, and a counter-die contact pad, sheet, or layer 244 attached or secured to base 242, and having, distal to base 242, broad counter-die surface 246 a sheet or backing sheet 244. In some embodiments, counter-die contact pad 244 may be directly attached or secured to base 242. However, as shown, counter-die contact pad 244 is attached to a counter-die sheet 248 disposed in intermediate fashion with respect to pad 244 and counter-die base 242.

A workpiece sheet such a cardboard sheet 260 is shown intermediately disposed between die surface 216 and broad counter-die surface 246.

Rule die system 200 is adapted such that a pressure exerted by the die surface 216 against a top or proximate surface 262 (i.e., facing die surface 216) of cardboard sheet 260 forms an elongate depression in surface 262. The pressure may be exerted by a variety of systems such as mechanized pressing or pressuring system 270, as will be appreciated by those of skill in the art, and is shown schematically.

Figure 3:
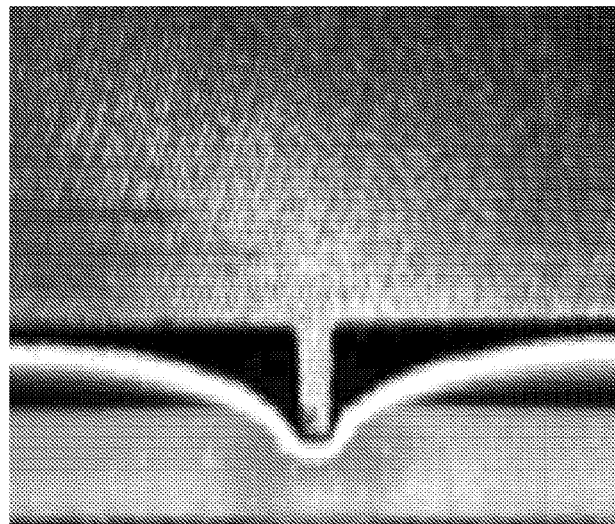
FIG. 3 provides a partial side image of the rule die system of FIG. 2, in the act of creasing a cardboard sheet.

FIG. 3 provides a partial side view of such a rule die system, in the act of creasing a cardboard sheet. The rule die is disposed opposite a resilient counter die, with the die surface protruding into the sheet or substrate disposed therebetween, and depressing the counter die surface, to form a crease in the sheet.

Figure 4:
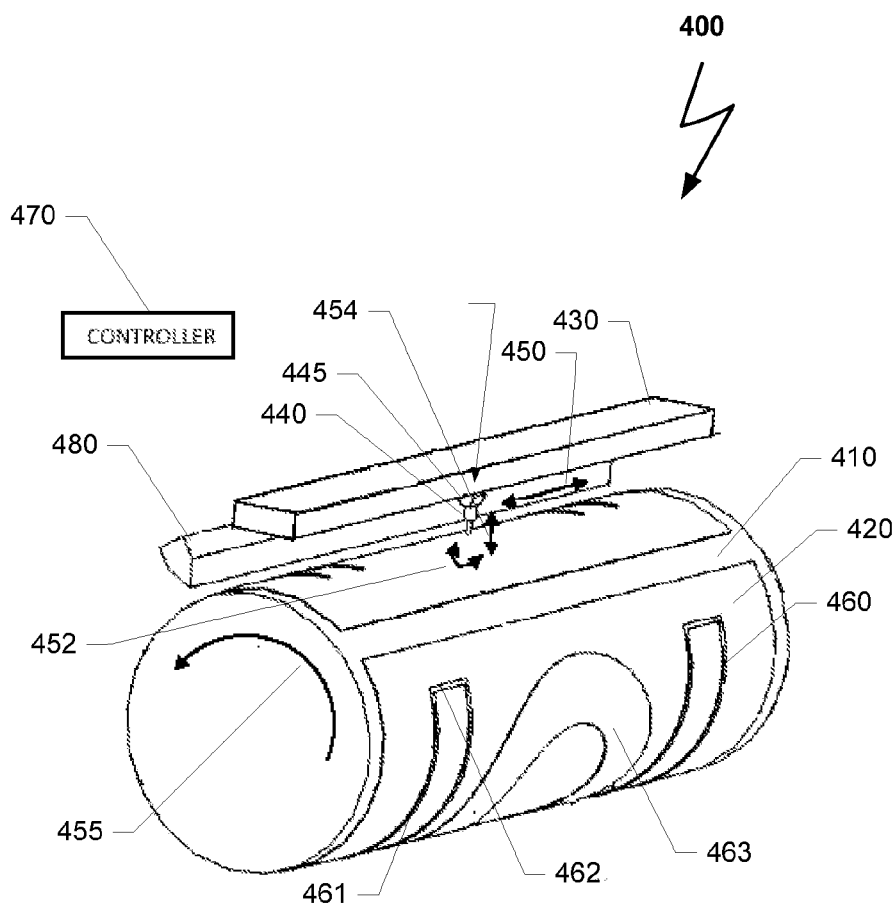
FIG. 4 provides a schematic diagram with relevant elements of a portion of a prior-art rotary rule-writing system.

FIG. 4 provides a schematic diagram with relevant elements of a portion of a rule-writing system such as a rotary system 400. Rotary system 400 may be used for drawing a plurality of rules 460-463 on a surface of a die base or substrate 420. Rules 460-463 may protrude from the surface of base 420 and may have different shapes and sizes. Rules 460-463 may be configured to crease a surface of a cardboard sheet.

Rotary system 400 may include a drum 410 on which base 420 may be positioned. Base 420 may be associated with or joined to the drum 410 by means of adhesion or gripping.

In some embodiments, base 420 may be removed from drum 410 after rules 460-463 are produced. In other exemplary embodiments, base 420 of the die may be left on the drum 410, to be used for creasing cardboard sheets in a rotary creasing system. In some embodiments, rotary system 400 includes at least one additional drum (not shown) that is adapted and positioned to serve as a counter-die.

In some embodiments, the counter-die contact surface or layer and/or base 420 may be made of a flexible film. The flexible film may include at least one type of polymer such as a polyethylene terephthalate (PET). Exemplary polymers include polyester, polyamide, and polycarbonate. Metallic films or foils such as aluminum foil or copper foil may also be suitable.

The flexible film of the counter-die may have a strong enough sustainability, firmness, inside-cohesion, robustness, to withstand the pressure and harsh operation which can be around a few tons of press force in one or more directions during the creasing of the cardboard workpieces.

Rotary system 400 may further include one or more rule-drawers. The rule-drawer may include a drawing head 435, a controller 470, and one or more rails 430. Drawing head 435 may include a nozzle arrangement 440, and at least one canister 445 fluidly associated with arrangement 440. Arrangement 440 may be associated with rail 430. In some embodiments, arrangement 440 may slide along rail 430. In some embodiments, canister 445 may also be associated with rail 430. In some embodiments, canister 445 may be independent of rail 430. Canister 445 may contain a rule-forming formulation for discharging under pressure by arrangement 440, so as to draw rules 460-463. In some embodiments, such pressure may be induced or delivered by a pneumatic system, or by a positive displacement system.

In some embodiments, the canister 445 and arrangement 440 may be associated with, or controlled by, a motor for moving canister 445 and/or arrangement 440 back and forth on rail 430 in a direction indicated by arrow 450. In addition, arrangement 440 may be adapted to rotate in the directions indicated by arrows 452. Arrangement 440 may also move up and down in the directions indicated by arrows 454. In some embodiments, drawing-head 435 may form a single unit, while in other embodiments, nozzle arrangement 440 and canister 445 may be moved independently from one another.

Drum 410 may be adapted to rotate in a counter-clockwise direction, as indicated by arrow 455. Optionally, drum 410 may rotate in a direction opposite to the direction indicated by arrow 455 (i.e., clockwise), or may rotate in both directions. Drum 410 may also be configured to move laterally in relationship to the rail. Controller 470 may control and coordinate the movement and operations of the different modules or elements, as well as the operations of rotary system 400. Controller 470 may control the rotation of drum 410, and the movement of nozzle 440 and canister 445. Controller 470 may also instruct and control arrangement 440 and canister 445 so as to deposit resin on die base 420 to produce a desired or pre-defined layout or pattern of rules 460-463.

The resin output by arrangement 440 may be hardened after and/or while the drawing is being performed. The hardening may be accomplished by a curing or hardening apparatus, such as a curing lamp 480.

Curing lamp 480 may radiate energy that can cause the drawn resin to harden and/or adhere. The radiated energy may include ultraviolet (UV) light, visible light, heat, etc.

The type of energy irradiated by curing lamp 480 generally depends on the type of resin and the hardening characteristics of that material. For example, when the resin is a thermosetting material, heat may be applied by curing lamp 480. When the resin is a thermoplastic material, curing lamp 480 may cool the material in order to harden it. When the resin includes a photo-initiator, curing lamp 480 may provide UV lighting to cure the resin.

Curing lamp 480 may be positioned adjacent to the nozzle 440 such that the resin may be hardened immediately after it is drawn. In other exemplary embodiments curing lamp 480 may be positioned at a distance from the nozzle 440.

Figure 5:
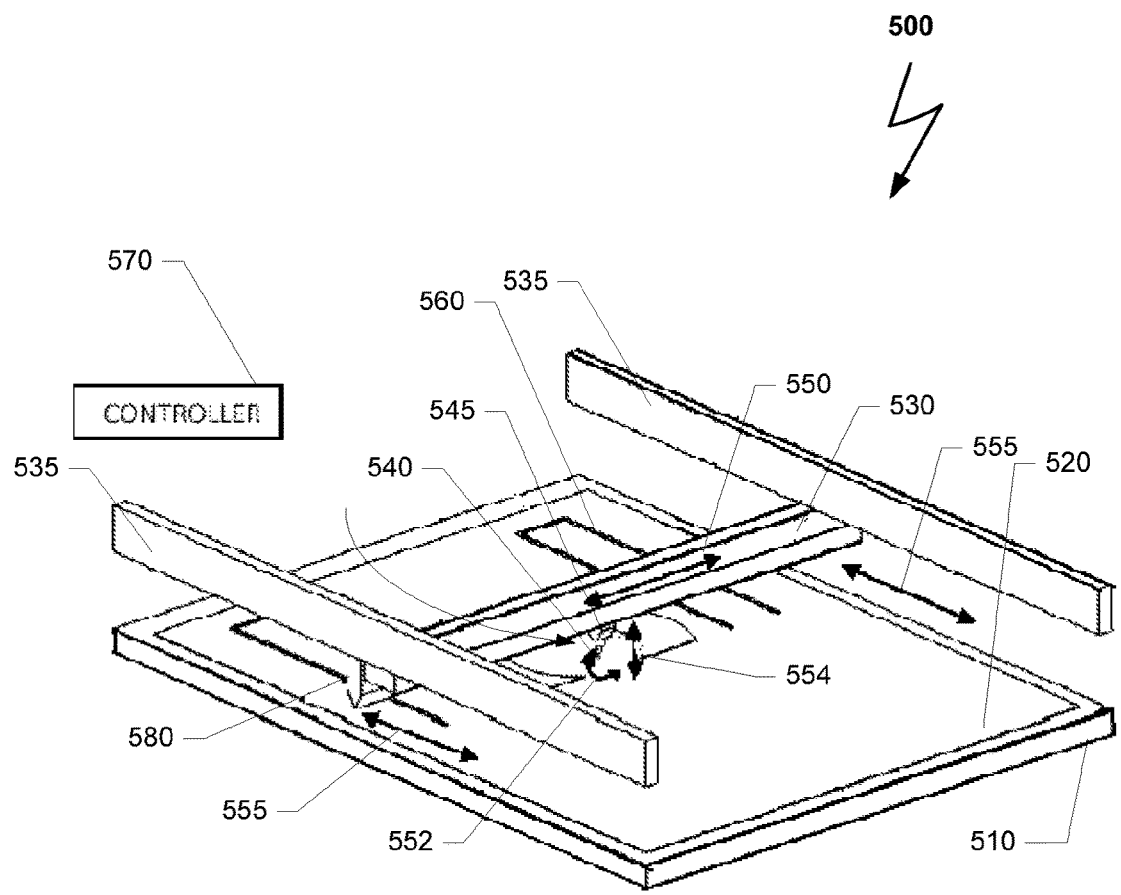
FIG. 5 illustrates an exemplary portion of a prior-art Cartesian coordinate rule-writing system.

FIG. 5 illustrates an exemplary portion with relevant elements of a flat system such as a Cartesian coordinate system 500. System 500 may be used for drawing a rule 560 on the surface of a die base 520 that may be positioned on a flat substrate 510. System 500 may include at least one rule-drawer. In some embodiments, the rule-drawer may include a drawing-head 535, a controller 570, and one or more rails 530. Drawing-head 535 may include a nozzle arrangement 540 and at least one canister 545 associated with, or fluidly coupled to, arrangement 540.

Rule 560 may be drawn by nozzle 540. Arrangement 540 may be associated with a motor powering arrangement 540 to traverse along rail 530 in the directions of arrow 550, for example. Arrangement 540 may be adapted to rotate in directions illustrated by arrows 552 and/or 554. Rail 530 may be situated between two rails 535, substantially perpendicular to rail 530 and may be adapted to travel in the directions of arrow 555, for example.

Controller 570 may be adapted to control the movement of the different modules of system 500. For example, controller 570 may control arrangement 540, rail 530, and canister 545. In some embodiments, system 500 may further include a lamp such as a UV lamp 580, adapted to cure rule 560 such that rule 560 firmly adheres to the surface of base 520.

Figure 6:
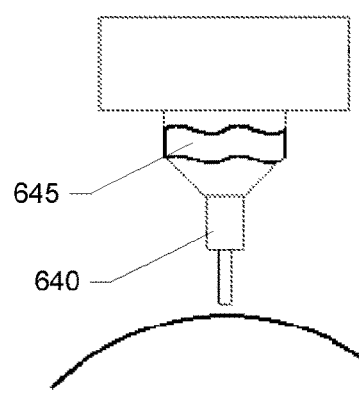
FIG. 6 provides an exemplary embodiment of a prior-art drawing-head.

FIG. 6 provides an exemplary embodiment of a drawing-head 600. Drawing-head 600 may include a nozzle arrangement 640 for depositing a continuous length ("bead") of resin. Arrangement 640 may be associated with or fluidly coupled to a canister 645.

Figure 7A:
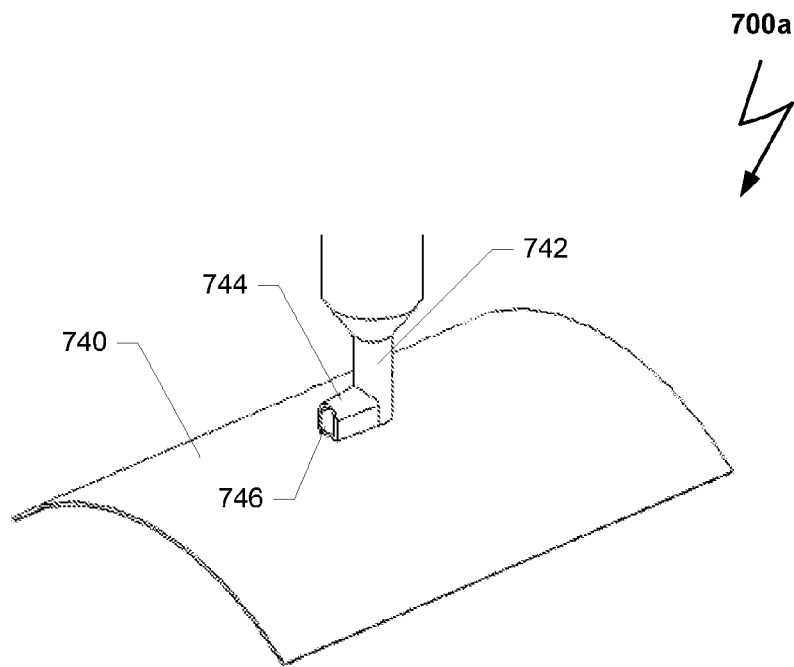
FIGS. 7a and 7b provide perspective illustrations of prior-art nozzle arrangements.

FIG. 7a provides a perspective illustration of an exemplary nozzle arrangement 700a. Arrangement 700a may include a first tube 742 that may be substantially perpendicular to a base 740 of the rule die. A second tube 744 may be oriented substantially perpendicular to first tube 742 and parallel to base 740. Tube 744 may have an orifice 746 at its end, through which resin may be output towards base 740.

Figure 7B:
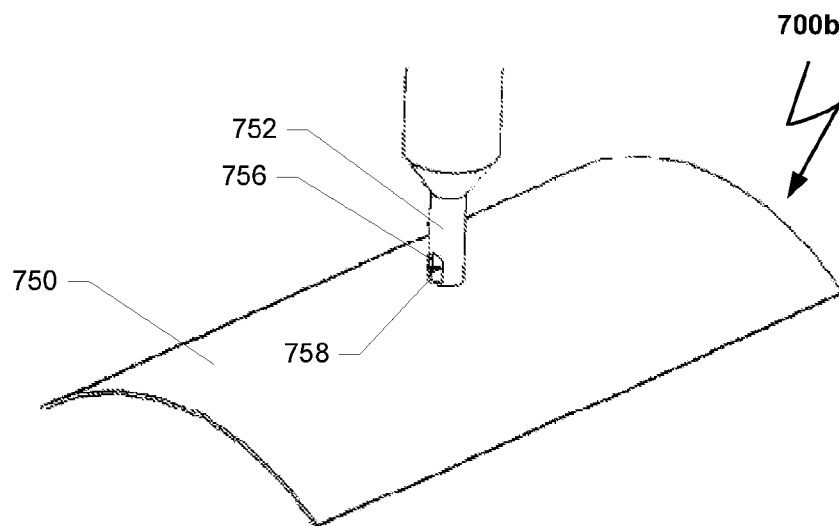

FIG. 7b provides a perspective view of another nozzle arrangement 700b. Arrangement 700b may include a tube 752 oriented substantially perpendicular to a die base 750. Tube 752 may include an orifice 756, through which resin may be output toward base 750. Optionally, tube 752 may be closed at a distal end 758, and the material may be released substantially parallel to die base 750, through opening 756. Alternatively, distal end 758 may be open and the resin may be output in a substantially perpendicular manner through distal end 758, as well as through orifice 756.

Figure 9:
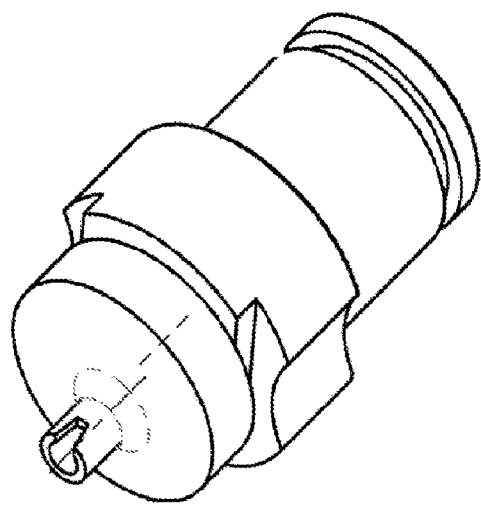
FIG. 9 provides a schematic perspective view of a prior-art canister having a generally trapezoidal orifice geometry.

A schematic perspective view of a canister having a generally trapezoidal orifice geometry is provided in FIG. 9.

Figure 8A:
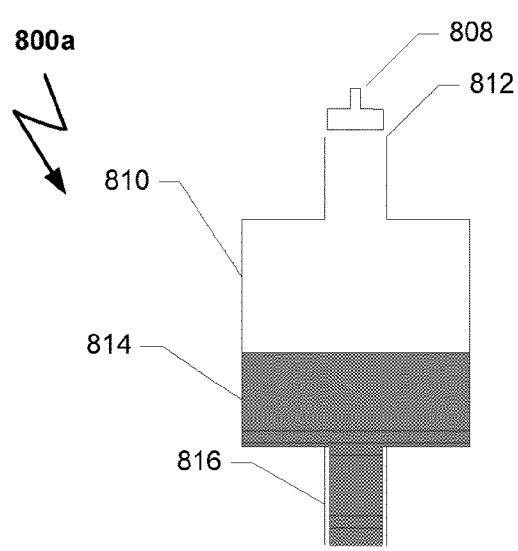
FIG. 8a schematically illustrates a prior-art pressure actuator.

FIG. 8a schematically illustrates a pressure actuator 800a. Pressure actuator 800a may be an air-pump actuator having a canister 810 adapted to contain a resin 814. Canister 810 may have an output 816 that fluidly couples canister 810 to a nozzle. The canister may have an input 812 through which air may be compressed and thus pneumatically drive out resin 814, through output 816, via a nozzle (not shown) so as to draw rules. The air may be compressed by a piston 808, which may be controlled by a controller.

FIGS. 10a-d schematically illustrate a flowchart showing relevant processes or actions of an exemplary rule drawing or writing method 1000. The illustrated rule drawing method 1000 may be executed by a processing device such as controllers 470 (FIG. 4) or 570 (FIG. 5). Method 1000 may be initiated 1002 upon powering on the controller or by other processes, system, events, user actions, etc. During initiation 1002, the controller may operate to detect the various modules in the system or, the various modules or other processors may provide information to the controller to identify the different modules. Exemplary modules may include, but are not limited to: drawing head modules, different registers, different timers, etc. After being invoked, the process may then act to reset, initialize or determine the state of various resources, registers, variables, memory components, etc. 1004. The various resources may include timers (t), counters (R), and distance measuring units (D).

After the system resources have been initialized 1004, rule drawing method 1000 may enter a delay loop waiting for the reception of an initiation command 1006. The initiation command directs the rule drawing method 1000 to commence the creation of a rule die. When an initiation request is received 1006, method 1000 may proceed to act 1008 by receiving or obtaining the entry of various inputs or parameters used in the creation of a rule die. The inputs may be received, obtained or entered by a user, provided by a processor or other entity, or read from an electronic file. Exemplary inputs may include, but are not limited to: the depth or thickness of the cardboard that will be pre-treated while using the rule die, the type of rules that will be required, the requested layout, and so on. Method 1000 may check 1010 a look-up table for information on the required job description. Exemplary information may include the definition of flow index for each rule, the definition of profile for each rule, the definition of the layers for the co-layers, the type of rule creasing, etc.

Once the information has been received, the method then decides whether additional information in the look-up table has been found or is available 1012. If additional information is not found 1012, then method 1000 may prompt the user or other information provider to enter or provide the information 1014, and processing then returns to act 1008 to check for this information. If the method obtains the information in the look-up table or otherwise 1012, then method 1000 may proceed to act 1018. Method 1000 may then proceed to execute a rule drawing loop that includes the acts listed in blocks 1018 through 1046 (FIG. 10d). The first action in the rule drawing loop includes increasing counter R by one (incrementing R) 1018, and method 1000 may begin drawing a rule in accordance with the information received at action 1010 and layout requirements.

Once the counter is increased, the method continues by adjusting or setting 1020 the height and angle of a nozzle t. In addition, the velocity of the drawing head modules may be accelerated 1020 to a required velocity V1 by acceleration rate a1, for example. The pressure applied by a one or more pressure actuators may also be raised 1020 to a required pressure P1. In some embodiments, e.g., in which screw-pumps are used, a screwing speed may be raised instead of raising pressure P1. Next, method 1000 may proceed to act 1022 at FIG. 10b.

After adjusting or setting the nozzle, velocity and pressure, the method continues by entering a delay loop 1022 until the value of timer t is equal to t1. The value of t1 may be calculated according to the mechanical capabilities of the drawing-head and the length required for the rule or rule segment according to the layout. When timer t value is equal to the value of t1, the acceleration rate a1 of the velocity of the drawing head modules may be stopped 1024 and the raising of the pressure of the pressure actuator may be stopped 1024 as well. Thus the drawing head modules may continue drawing at velocity V1 and the pressure actuator may continue pressing at pressure P1. In alternate embodiment instead using a timer, a distance measurement D may be used. Distance measurement D may be expressed by a number of steps given to a step-motor or by feedback received from a step measurement encoder associated to the drawing head.

While the drawing continues, the method 1000 may enter into a delay loop until the value of counter t is equal to t2 1026. Wherein t2 may be calculated from inputs on the drawn pattern of the rule and the velocity that was reached at t1. When the timer t value is equal to t2 1026, the velocity of the drawing head modules may be decelerated 1028 to V2 at deceleration rate a2, and the pressure by the pressure actuator may be decreased 1028 to P2. In exemplary embodiments, the nozzle may be 1030 elevated X mm and turned 1030 to an angle O according to the requirements of the layout. Next the nozzle may be lowered 1030 Z mm (wherein Z may equal X).

Method 1000 continues by accelerating the drawing head modules to a velocity of V1 at an acceleration rate of a1, and the pressure of the pressure actuator may be raised to P1 1032. The drawing head modules may continue to draw 1032 the rules according to the layout. Method 1000 may then proceed to act 1034 at FIG. 10c.

Figure 10A:
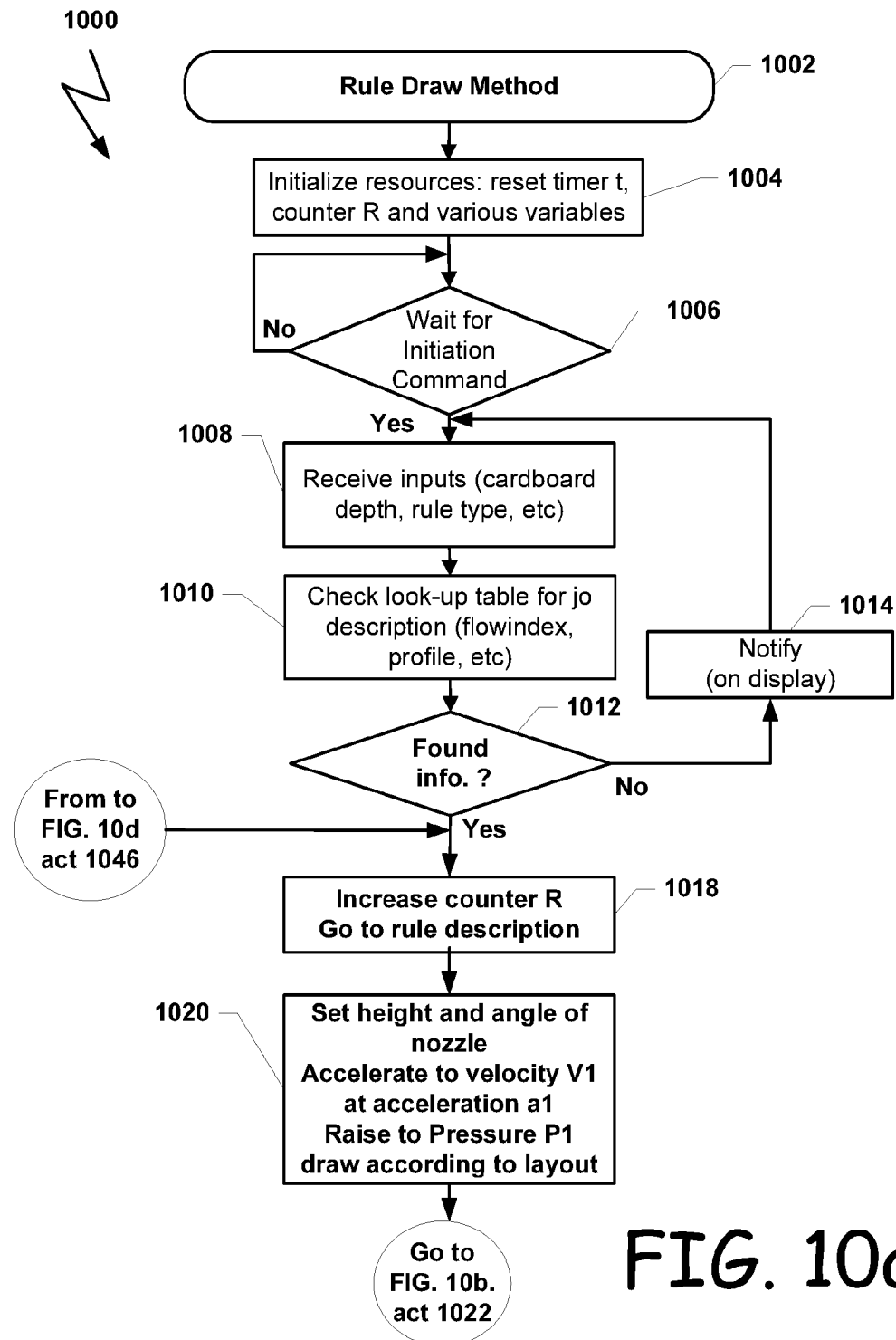
FIGS. 10a-d schematically illustrate flowcharts showing relevant processes or actions of prior-art rule drawing methods.
Figure 10B:
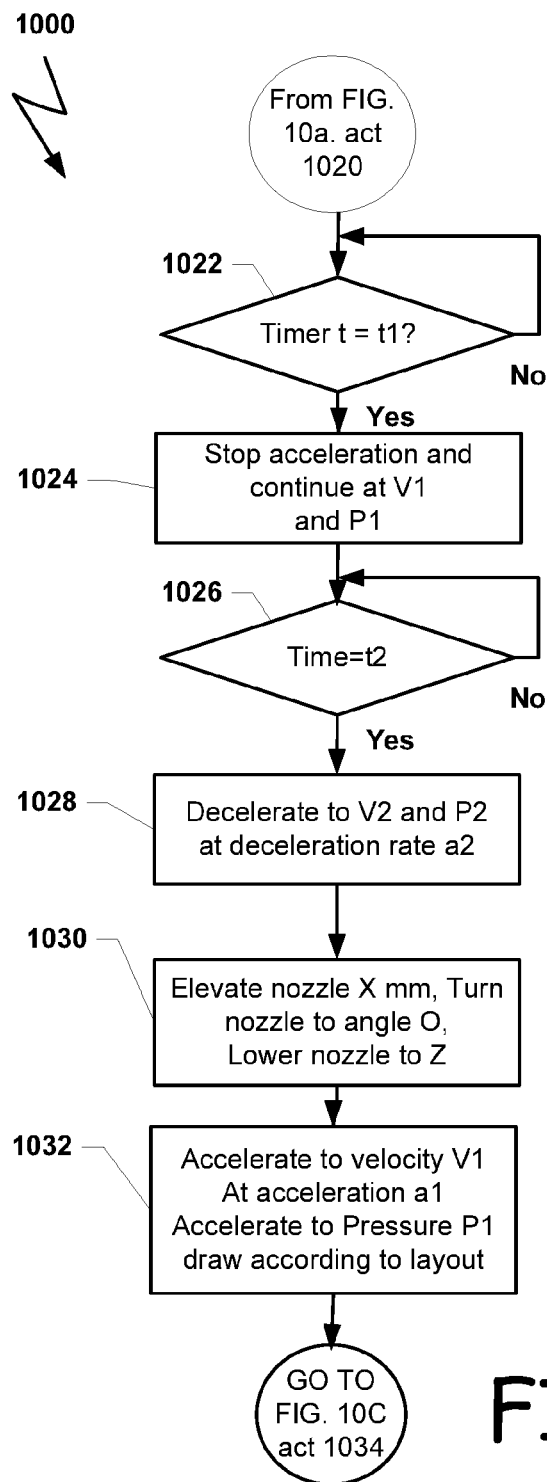
Figure 10C:
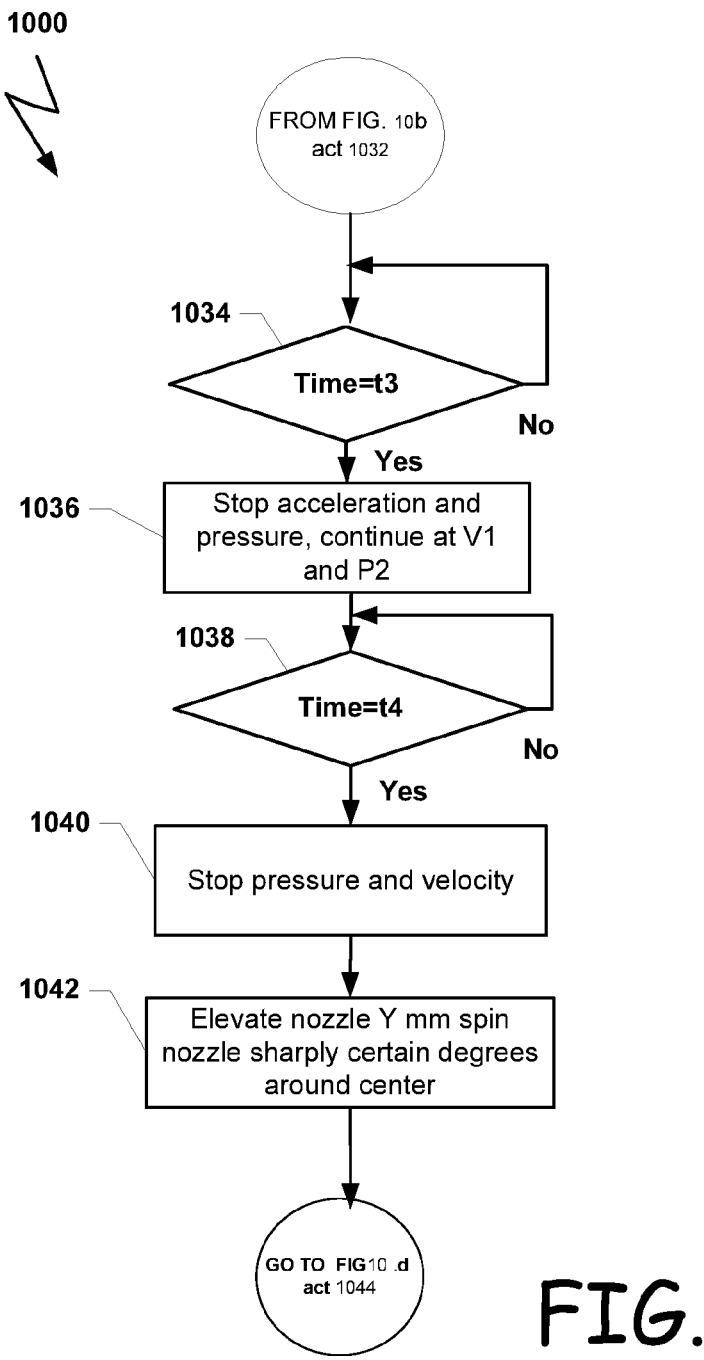
Figure 10D:
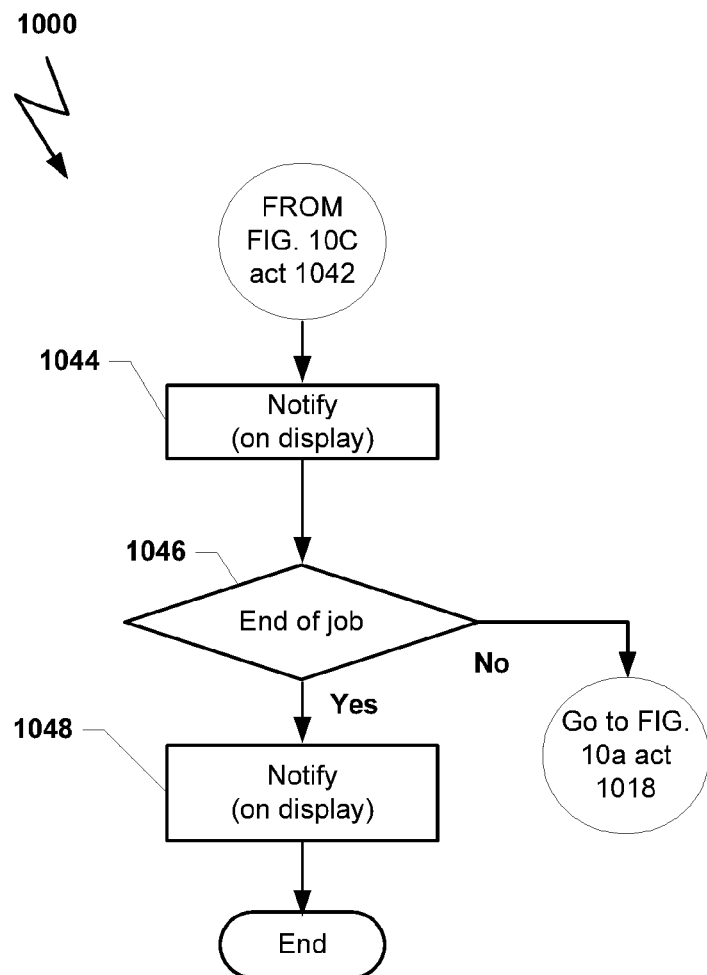

Method 1000 continues at act 1034 of FIG. 10c by entering a delay loop until the value of the timer t is equal to t3 1034. When the timer t value is equal to t3 1034, the acceleration of the velocity of the drawing head modules and the raising of the pressure by the pressure actuator may be stopped 1036. The drawing head modules may continue drawing at velocity V1 and the pressure actuator may continue at pressure P1 1036. Next, method 1000 may enter a delay loop until the value of timer t is equal to t4 1038. When the timer t value is equal to t4 1038, the pressure imposed by the pressure actuator may be stopped 1040, and the motion of the drawing head modules may be stopped 1040 as well. The nozzle may be elevated to a desired level by raising it Y mm and then controlled to spin sharply 1042 at a particular angle (e.g., 180-360°) around its center, for example. The spinning of the nozzle serves to cut the flexible material from the nozzle. One of skill in the art will appreciate that an air-pulse, shutter, blade, or air knife may similarly be used to cut the flexible material from the nozzle. Method 1000 may then proceed to step 1044 in FIG. 10d.

At this point in the process, method 1000 may provide an indication 1044 that the rule has been drawn. Next, method 1000 determines whether all of the rules have been drawn and the job has been finished 1046. If the job is finished 1046, then method 1000 may provide a suitable indication 1048. If the job has not yet been finished, then method 1000 may return to step 1018 of FIG. 10a to commence drawing the rule.

With regard now to the formulations used to produce the rules, the rule formulations were prepared according to the following procedure:

Into a 300 ml mixing vessel are added up to about 150 grams of weighed formulation components. The mixing vessel is introduced to a planetary centrifugal vacuum mixer, and the following mixing sequence is applied: 1 min at 1000 rpm, applying a deep vacuum in order to degas the formulation; 3 min at 2000 rpm under vacuum (10 KPa); gradually raising the pressure, from 10 KPa to atmospheric pressure, to prevent air bubbles from entering the formulation: 2 min at 1000 rpm under vacuum (30 KPa), 1 min at 2000 rpm under vacuum (60 KPa).

To the obtained mixture, any remaining thickening agent is added, and mixing ensues as follows: 1 min at 2000 rpm, applying a deep vacuum in order to degas the formulation; 3 min at 1000 rpm under vacuum (10 KPa); 5 min at 2000 rpm under vacuum (10 KPa); gradually raising the pressure, from 10 KPa to atmospheric pressure, to prevent air bubbles from entering the formulation: 2 min at 1000 rpm under vacuum (30 KPa), 1 min at 2000 rpm under vacuum (60 KPa).

To further degas the formulation, the obtained resin may be transferred to a 600 ml centrifuge swinging-bucket rotor (H-6000). The resin may undergo centrifuging at 4800 RPM for about 30 min using a Sorvall RC 3C centrifuge or an equivalent thereof.

The degassed resin obtained may be introduced to a canister under pressure. It may be advantageous to yet further degas the formulation. The canister may be placed in an oven for 10 min at 70° C. Subsequently, pairs of canisters may be loaded into the rotor by utilizing an H-6000 adaptor. The resin-filled canisters may then undergo centrifugation at 4800 RPM for about 30 min.

Materials and Equipment

| cas name | chemical name/ components | Commercial Name | Supplier | Description |
|---|---|---|---|---|
| 5888-33-5 | isobornyl acrylate | GENOMER 1121 | RAHN | IBOA |
|  | acrylated oligoamine resin | GENOMER 5275 | RAHN |  |
| 24599-21-1 | 2-(phosphonooxy)ethyl methacrylate-25-50% | GENORAD 40 (blend) | RAHN | propene acid phosphonoxy ester |
| 32435-46-4 | bis(methacryloyloxyethyl) hydrogen phosphate 25-50% |  |  |  |
| 52408-84-1 | glycerol, propoxylated, ester with acrylic acid 50-90% | GENORAD 20 | RAHN | polymerization inhibitor in acrylic acid ester |

-continued

| cas name | chemical name/ components | Commercial Name | Supplier | Description |
|---|---|---|---|---|
| 75980-60-8 | Diphenyl(2,4,6-trimethylbenzoyl) phosphinoxid 10-25% | GENOCURE LTM | RAHN | photoinitiator blend |
| 119-61-9 | benzophenone 25-50% | GENOCURE LBC | RAHN | photoinitiator blend |
|  | Aliphatic urethane methacrylate | SPECIALTY RESIN 09-256 | RAHN |  |
| 68 909-20-6 | hydrophobic fumed silica | AEROSIL 812 | Evonik | a fumed silica after-treated with HMDS based on AEROSIL ® 300 |
| 42594-17-2 | tricyclodecane dimethanol diacrylate | SR833S | Sartomer Eur. div. of Arkema |  |
| 112945-52-5 | silicon dioxide, synthetic amorphous silica, pyrogenic (fumed) amorphous silica | CAB_O_SIL M-5 | Cabot |  |
| 41637-38-1 | ethoxylated (4) bisphenol A dimethacrylate | SR540 | Sartomer Eur. div. of Arkema |  |

Planetary centrifugal vacuum mixer—THINKY MIXER ARV-310CE.

EXAMPLES

Reference is now made to the following examples, which together with the description provided herein, illustrate the invention in a non-limiting fashion.

Examples 1-10

Ten rule formulations (Examples 1-10) were prepared in accordance with the above-described procedure. The formulation compositions are provided below, in weight-percent:

| Commercial Name | EXAMPLE NUMBER (SAMPLE NUMBER) | | | | | | | | | |
|---|---|---|---|---|---|---|---|---|---|---|
|  | 9 | 7 | 4 | 1 | 8 | 2 | 6 | 3 | 5 | 10 |
| GENOMER 1121 | 39.6 | 58.1 | 29.8 | 25.35 | 46.3 | 31.8 | 27.6 | 32 | 29.1 | 0.0 |
| GENOMER 5275 | 10.5 | 10.5 | 10.6 | 10.5 | 0.0 | 11.3 | 9.8 | 10.3 | 10.1 | 4.4 |
| GENORAD 40 (blend) | 2 | 2 | 2.0 | 2 | 0.0 | 2.1 | 1.9 | 2.0 | 1.8 | 0.0 |
| GENORAD 20 | 0.8 | 0.8 | 0.8 | 0.8 | 0.0 | 0.9 | 0.7 | 0.8 | 0.8 | 0.0 |
| GENOCURE LTM | 2.8 | 2.8 | 2.8 | 2.8 | 1.3 | 3.0 | 2.6 | 2.9 | 2.7 | 2.8 |
| GENOCURE LBC | 2.8 | 2.8 | 2.8 | 2.8 | 4.3 | 3.0 | 2.6 | 2.9 | 2.7 | 2.8 |
| SPECIALTY RESIN 09-256 | 28.5 | 10 | 28.7 | 42.75 | 4.3 | 30.6 | 26.5 | 29.5 | 27.5 | 90.0 |
| AEROSIL 812 (pre-ground) | 13 | 13 | 12.4 | 13 | 0.0 | 6.5 | 19.0 | 9.8 | 15.8 | 0.0 |
| SR833S |  |  | 10.1 |  | 15.6 | 10.7 | 9.3 | 9.8 | 9.5 | 0.0 |
| CAB_O_SIL M-5 |  |  |  |  | 15.2 |  |  |  |  |  |
| SR540 |  |  |  |  | 12.9 |  |  |  |  |  |

Example 11

Example 11 was prepared using the same composition as Example 4, but without performing the de-aeration steps.

Example 12

Example 12 was prepared using the same proportion of components as Example 9, but with 19% (instead of 13%) AEROSIL 812.

Example 13

In order to evaluate various mechanical properties, the written rules were cured according to the following standard curing procedure:

The ultraviolet (UV) curing system used was LC6B Benchtop Conveyor of Fusion UV Systems, Inc. (Maryland, US). Curing was performed at room temperature, with a UV power of 300 watts/inch, three passes at a belt speed of 2.4 m/min.

Some of the cured formulations being subjected to mechanical testing were processed according to ASTM 638-03, Type I (table), to obtain the requisite size and shape for the mechanical testing.

Example 14

In order to evaluate mechanical properties associated with creasing, the written rules were cured according to the following procedure:

The ultraviolet (UV) curing system used had a UV lamp. Curing was performed at room temperature, with a UV power of 80 watts/cm. For each sample, the drum was rotated three times, at a drum jogging speed of 19.3 mm/second. The UV lamp was fixed at a distance of 3 mm from the PET film serving as the rule substrate.

Rule Writing

The formulations may be dispensed from the canister, through an orifice, under pressure, e.g., by pneumatic force or by positive displacement. While various orifice geometries may be used, in all experiments described herein, the orifice geometry was substantially as shown in FIG. 7B.

The inventors have discovered that there are various, somewhat rigorous conditions that the formulations must fulfill in order to succeed in writing a rule having a first set of appropriate characteristics, and, following curing, having a second set of appropriate characteristics.

For some embodiments, the inventors have discovered that the presence of gas (e.g., air, or nitrogen) within the rule formulation, even in small quantities, may be extremely detrimental to rule performance. Gas bubbles in the uncured formulation may affect the rheological properties of the formulation under pressure in the canister, or during writing of the rule. Gas bubbles in the bulk of the cured rule may detract from various requisite mechanical characteristics, and may appreciably reduce the lifetime of the rule (e.g., the number of creases achieved prior to failure or prior to producing off-standard creases). Moreover, any gas bubbles disposed at or near the contact surface of the rule may cause pocking of the contact surface, which may compromise or substantially destroy creasing quality.

Figure 11:
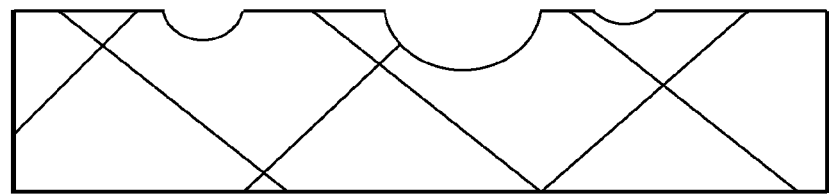
FIG. 11 provides a schematic cross-sectional view of a rule having pockmarks resulting from the liberation of gas bubbles.

FIG. 11 provides a schematic cross-sectional view of a rule having pockmarks resulting from the liberation of gas bubbles.

As described hereinabove, the inventors have developed a procedure to degas the highly viscous formulations of the present invention, to remove any gas generated or liberated during the preparation procedure, and to remove additional gas that may be introduced to the canister during the filling process.

Moreover, the inventors have developed a procedure to quantitatively distinguish between sufficiently and insufficiently degassed batches, by measuring the specific gravity, or density, of the resin beads, as follows:

Two batches of the formulation of Example 4 were prepared, a first batch that underwent the vacuum and degassing procedures described hereinabove, and a second batch prepared in identical fashion, but without vacuum and degassing procedures (Example 11). A cylinder-shaped resin bead or was produced by extruding the resin from a canister having an orifice diameter of 12 mm. The bead length was 120 mm for each batch of the formulation. Both resin beads were disposed on a PET film.

Figure 12A:
FIG. 12A is a photograph of a bead produced from an undegassed formulation.
Figure 12B:
FIG. 12B is a photograph of a bead produced from a degassed formulation, in accordance with the present invention.

FIG. 12A is a photograph of the bead corresponding to the undegassed formulation; FIG. 12B is a photograph of the bead corresponding to the degassed formulation, in accordance with the present invention. As may be evident from FIG. 12A, the bead corresponding to the undegassed formulation has a pocked surface as well as bubbles within the bead. The bubbles contribute to the light diffraction that may be observed in the bead. By sharp contrast, the bead corresponding to the degassed formulation is substantially devoid of bubbles and surface pocks, contributing to the mechanical strength of the rule die, uniformity of mechanical properties, and the smoothness of the rule die contact surface.

While it is possible to measure the density of a bead in an uncured state, e.g., by submerging the bead in a liquid (of known volume and weight) to obtain differential volume and weight values, the inventors have found it convenient to at least partially harden the bead. The hardening criterion is simply the effecting of sufficient polymerization for the bead material not to stick to the side walls of the glass tube partially filled with water, as the bead is introduced thereto.

To this end, the PET foil with the resin beads was introduced to the UV-LC6B Benchtop Conveyor machine (belt speed: 2 m/min) for a single cycle. Resins of other compositions might require additional curing, if sticking is observed.

The glass tube was pre-weighed, and was weighed again after partial filling with 60 ml of water. The resin bead was then submerged in the water, and both the volume (using the meniscus) and the new glass tube weight were determined.

Each measurement was performed 5 times using the same bead material for repeatability assurance, and 5 times with different bead materials to determine variability.

With regard to repeatability, the five beads produced from the degassed formulation had a density that varied by about ±0.001 g/cm$^3$; the five beads produced from the undegassed formulation had a density that varied by about ±0.003 g/cm$^3$. With regard to variability, the five beads produced from the degassed formulation had an average density of about 1.22 g/cm$^3$±0.001; the five beads produced from the undegassed formulation had an average density of less than 1.14 g/cm$^3$.

As used herein in the specification and in the claims section that follows, the term "baseline density", or "$\rho_{baseline}$", refers to the density achieved by a resin formulation that was prepared according to the procedure described hereinabove, and used to prepare Examples 1 to 10.

As used herein in the specification and in the claims section that follows, the term "bulk density", or "$\rho_{bulk}$", refers to the density achieved by a resin formulation that was prepared according to the procedure described hereinabove, but without any of the degassing procedures, as used to prepare Example 11.

Since, as delineated above, $\rho_{baseline}$ and $\rho_{bulk}$ may be determined in an uncured state, or in an at least partially cured state, the terms "baseline density" and "bulk density" may refer to any of these states. Of course, the differential, defined by $\Delta\rho=\rho_{baseline}-\rho_{bulk}$, must be evaluated on formulations that are both uncured, or have been subjected to the identical curing procedure.

In any event, in some embodiments of the present invention the differential density, $\Delta\rho=\rho_{baseline}-\rho_{bulk}$, is at least 0.01, or at least 0.015, and more typically, at least 0.02, at least 0.025, at least 0.03, at least 0.04, at least 0.05, or at least 0.06, and in some cases, at least 0.07.

Often, gas bubbles within the rules (both cured and uncured) may be visually observed. In the rules of the present invention, over a total length of the rule or rules, the bubble content of visually-observable bubbles, having a diameter (or a small dimension, for elongated bubbles) above 0.4 mm, is at most 2 bubbles/meter, and more typically, at most 1.5 bubbles/meter, at most 1 bubble/meter, at most 0.7 bubbles/meter, at most 0.5 bubbles/meter, at most 0.4 bubbles/meter, or at most 0.3 bubbles/meter. By way of example, if there exists a single die having a total length of 0.75 meters of the polymeric rules, and 1 visually-observable bubble is observed, the bubble content would be about 1.33 bubbles/meter, which would satisfy the criterion of "at most 1.5 bubbles/meter", but would fail to satisfy the criterion of "at most 1 bubble/meter".

In some embodiments, over a total length of the die or contact surface of the inventive formulation, rule or rule die, a presence of visually-observable surface pocks, depressions, or craters, or surface pocks, depressions, or craters having a diameter above 0.1 mm is at most 5 pocks/meter, at most 4 pocks/meter, at most 3 pocks/meter, at most 2 pocks/meter, at most 1.5 pocks/meter, at most 1 pock/meter, at most 0.8 pocks/meter, at most 0.6 pocks/meter, at most 0.4 pocks/meter, or at most 0.3 pocks/meter.

Even after thorough degassing of the formulations, the inventors have found that while various formulations may successfully be written onto a die substrate or film, there are numerous reasons that the resultant rule may not perform in satisfactory fashion.

The formulation described in Example 10 is a highly viscous polymeric formulation, devoid of any thickening agent (e.g., a three-dimensional network former such as silica). Despite the apparent suitability of the viscosity, the inventors were not successful in writing or drawing a rule, under standard writing conditions.

Figure 13B:
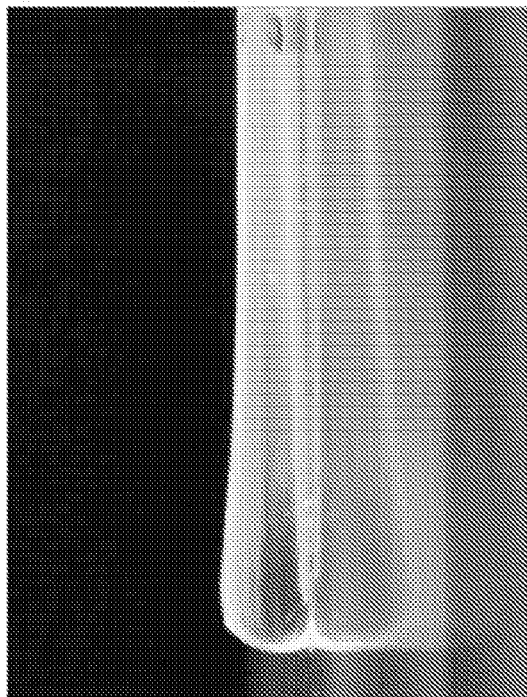
FIGS. 13A and 13B are images of written rules having various disadvantageous features.
Figure 13A:
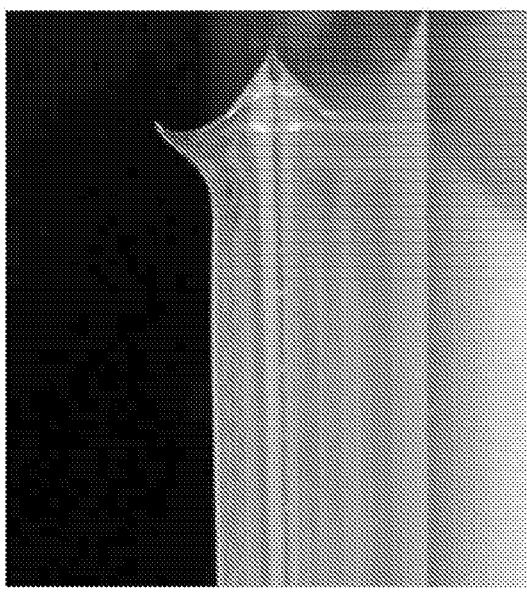

FIGS. 13A and 13B are photographs of written rules having disadvantageous features. While the rule in FIG. 13A advantageously has a relatively flat upper (die or contact) surface along the predominant longitudinal portion of the rule, the rule end is spiked, which may deleteriously affect crease quality. The rule provided in FIG. 13B also has a relatively flat upper surface along the predominant longitudinal portion of the rule. However, towards the end of the rule has a bulge extending upwards and to the sides, which, again, may deleteriously affect crease quality.

Figure 13C:
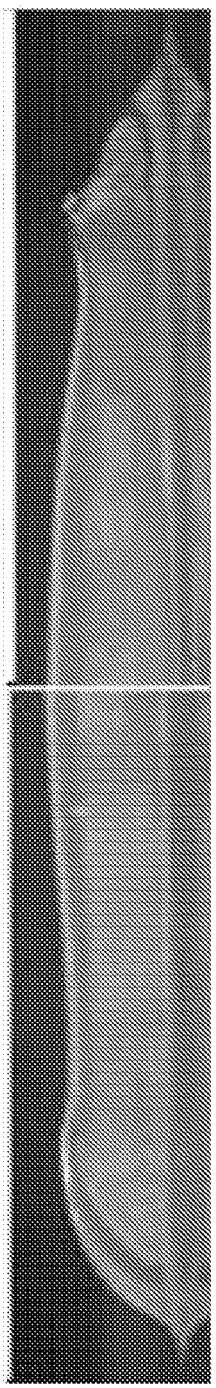
FIG. 13C is an image of a rule written using the inventive formulation of Example 1.
Figure 14:
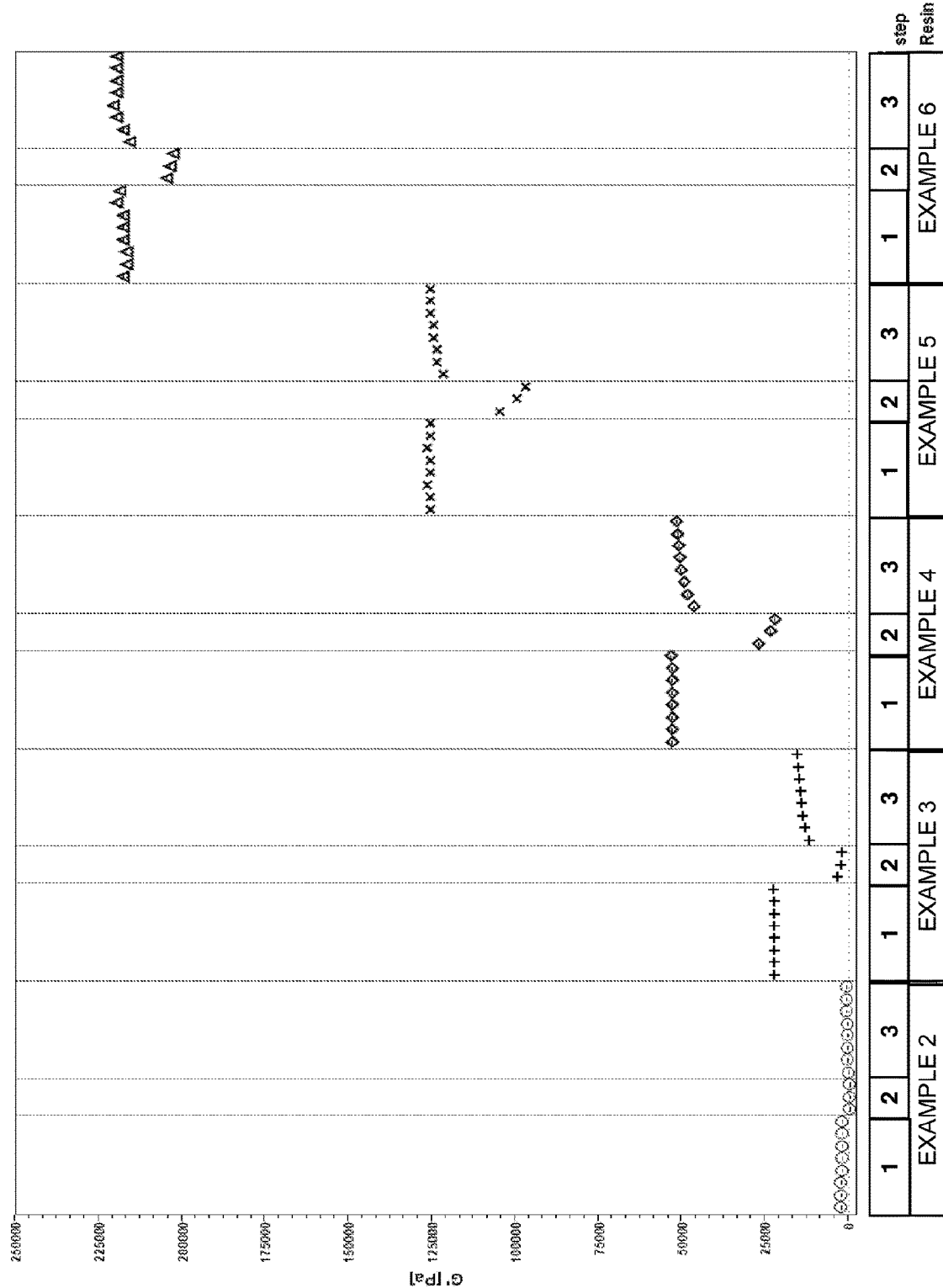
FIGS. 14-17 provide comparative plots of G' as a function of time (and Step No.) for the formulations of Examples 2-9 and 12.

The formulation described in Example 1 produced a continuous rule, however, both the shape replication (with respect to the rectangular orifice geometry) and the shape retention (after writing, until curing ensues) appeared unsatisfactory. FIG. 13C provides a photograph of a rule written using the formulation of Example 1.

The formulation described in Example 2 produced a continuous rule. However, from the cross-sectional profile of Example 2 provided in FIG. 18, it is manifest that the shape of the cured rule has little resemblance to the rectangular geometry of the writing orifice.

In terms of rule writing, the formulations described in Examples 3, 4, 5, 6, 7, 8, and 9 and 12 produced continuous rules on the PET substrate, generally of good form.

The formulation described in Example 8, which had a high glass transition temperature, achieved excellent hardness upon curing. During the curing process, however, the rule underwent appreciable shrinking, and became detached from the PET substrate.

The inventors have found that various rheological characteristics of the formulations may be useful in formulating formulations suitable for writing rules. These characteristics may also provide significant guidance in selecting materials for those formulations.

One important rheological parameter is the storage modulus, G', which characterizes the deformation energy stored by the sample during the shear process. After the load is removed, this energy is completely available, and may act as the driving force for the reformation process, which partially or completely compensates the previously obtained deformation of the structure. Materials that store the entire deformation energy are considered reversibly deformable, or elastic.

The loss modulus, G", characterizes the deformation energy consumed by the sample during the shear process. In other words, G" represents the viscous behavior of a material.

The rheological test procedure was performed as follows:
The material sample was checked for air bubbles in order to assure the reliability of the test. An AR2000 Rheometer, having a 4 cm stainless steel cone (3.58 degrees) was used. Following calibration, the cone-plate distance reached a gap of 104 μm, a standard instrument parameter. Excess resin was removed from the sample plate and which was then covered with the apparatus cover to maintain temperature at 25° C.

Time sweep tests were performed under these conditions:
STEP 1: equilibration=5 min.; oscillation stress=40 Pa, for 1 min.;
STEP 2: equilibration=0 min.; oscillation stress=300 Pa, for 20 sec.;
STEP 3: equilibration=0 min.; oscillation stress=40 Pa, for 2 min.

Plots of G' as a function of time were then generated.

FIGS. 14-17 provide comparative plots of G' as a function of time (and Step No.) for the formulations of Examples 2-9 and 12.

Figure 15:
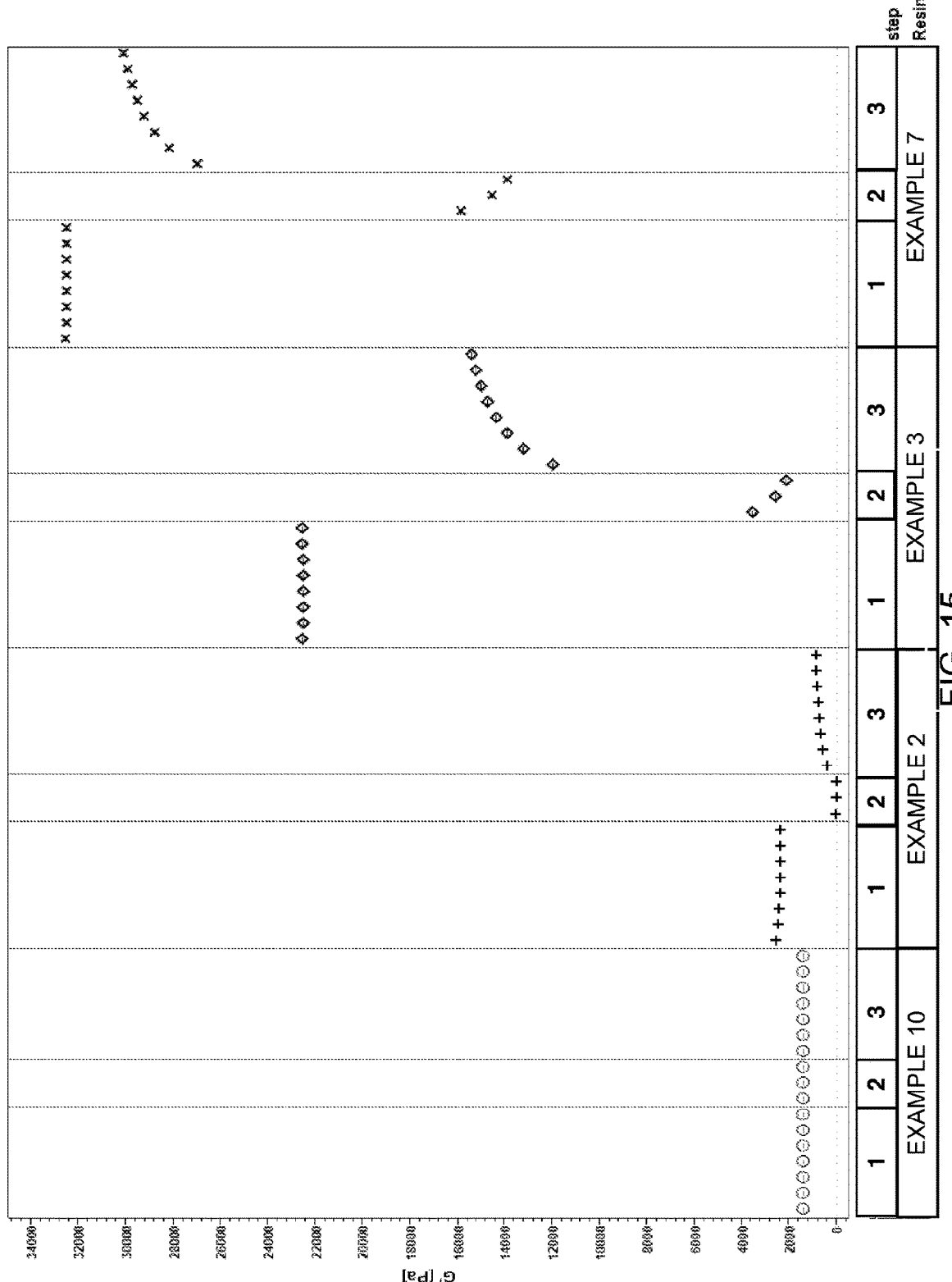
Figure 16:
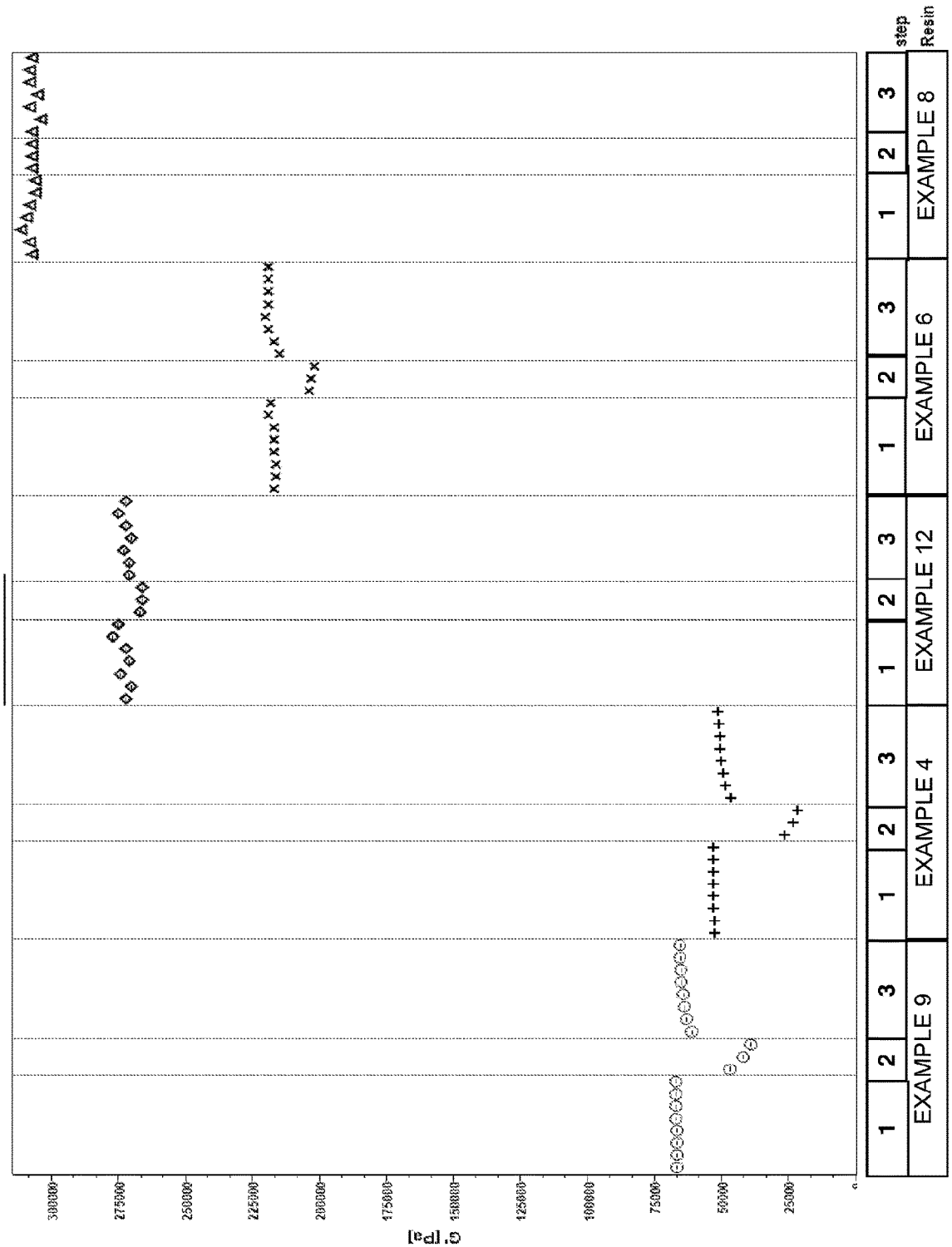
Figure 17:
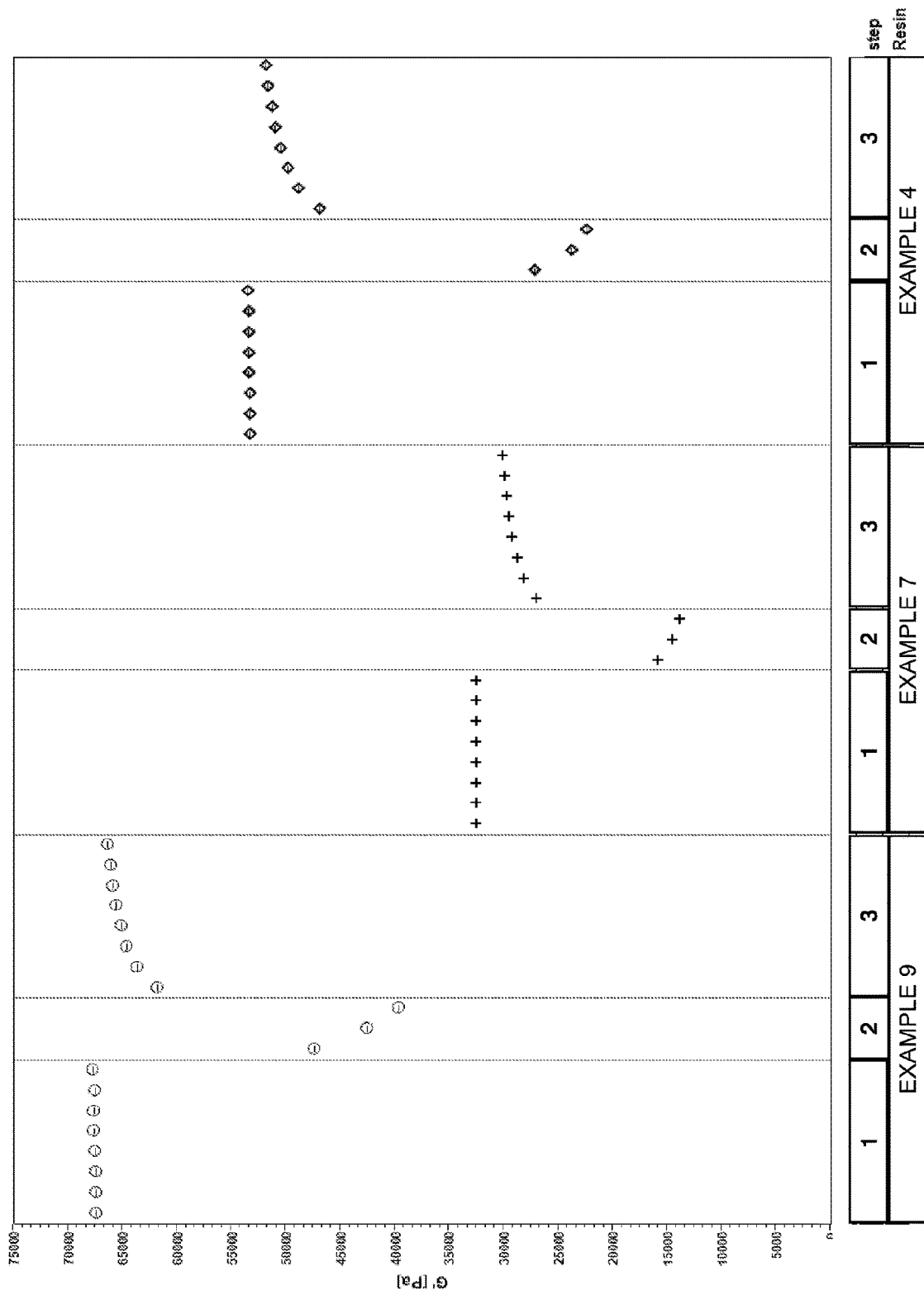

The inventors have observed that formulations having a relatively low G' in STEP 1 may be generally unsuitable for the writing procedure. Empirically, the formulations of Example 2 and Example 10 were found to write less well than the other exemplary formulations. Plots for Example 2 and Example 10, provided in FIG. 15, show that G' in STEP 1 is below about 2500 Pa for Example 2 and below about 2000 Pa for Example 10.

Moreover, many of the formulations exhibited thixotropic behavior, which manifested itself in the recovery time in STEP 3 to regain the initial value of G' in STEP 1, following the intense oscillation stress of 300 Pa in STEP 2. Many of the formulations (e.g., Example 3, Example 7) failed to regain the initial value of G', within the timeframe of STEP 3.

The inventors believe that the lag time in regaining a minimal G' threshold may be important in screening out formulations that are generally unsuitable for the present invention. That minimal threshold, under the above-delineated conditions for the time sweep tests, may be at least 2,500 Pa, within 7 seconds of the abrupt relaxation of stress at the end of STEP 2. Without wishing to be bound by theory, the inventors believe that below such a minimal G' recovery threshold, the resultant rule profile may be rounded (poor shape replication and/or shape retention), and the shape may actually worsen with time before the onset of curing. Above this threshold, the thixotropic lag may not be detrimental. The rules produced from Examples 4, 6, 7, and 9 all exhibited reasonable rule profiles, despite the clear thixotropic behavior in STEP 3. Similarly, Example 3 produced an acceptable rule profiles, despite the clear thixotropic behavior in STEP 3. In these 5 formulations, the minimum G' value recorded after 7 seconds into STEP 3 was over 10,000 Pa.

Other features of the formulations and rule dies of the present invention may be shown using various characterizations. One such characterization is a "standard deformation procedure".

Writing of the rules was effected via a nozzle or orifice of a canister filled with each formulation. Pressure was applied by means of positive displacement (a pneumatic mechanism may also be used), the absolute pressure being a function of, inter alia, the rheological properties of the formulation. The nozzle had a rectangular profile: of 0.7 mm width and 1.5 mm height. The distance of the nozzle from the substrate film (PET) was approximately 200 micrometers.

Curing was effected according to the procedure provided in Example 14.

Each cured rule was then cut to a rectangular profile of 1.45 mm·0.65 mm (Hp·Wr), to form a rectangular prism.

The 300 gsm cardboard sheets were of the American Bristol category, having dimensions of 1060 mm·720 mm. The running or feeding speed was 400 pph (papers per hour). It will be appreciated by those of skill in the art that various rotary machines of this type are commercially available.

The lower drum had a polyurethane counter-die having a thickness of 2 mm. The crease pressure depth was 1 mm.

For each rule being tested, three lines of 100 mm in length were written in the cross machine direction. After completing the run of 30 sheets, three lines of 100 mm in length were again written in the cross machine direction using the same PET sheet (for reference). The partially creased cardboard substrate was then removed. Thirty cardboard sheets are processed in this manner for each tested rule. Subsequent to this procedure, a picture of a representative rule cross-section is taken using OGP, "Starlite" tool, model: QVL Starlite 250.

As used herein in the specification and in the claims section that follows, this procedure is termed "standard deformation procedure".

Some deformation in the rule may be observed following this accelerated test. Typically, lateral deformation is an important component of the deformation. FIG. 18 provides images of rules produced from the formulations of Examples 1, 9, 7, 4, 2 and 6, before and after the deformation procedure was conducted. The procedure was not the full "standard deformation procedure", in that the rules were not trimmed to the standard rectangular profile of 1.45 mm·0.65 mm.

It is observed that the rule produced from formulation 2 exhibited poor overall shape replication/retention, and the rule height was well short of the required 1.45 mm. It must be emphasized that the heights measured in FIG. 18 refer to Hr and not to Hp.

It is further observed that the rules produced from formulations 1 and 9 exhibited appreciable lateral deformation. In contrast, rules produced from formulations 4, 6 and 7 exhibited negligible, or substantially no, lateral deformation.

This deformation may be quantified in many ways, as will be appreciated by those of skill in the art. One practical quantification method is provided below:

Following the standard deformation procedure, the photograph of the representative rule cross-section is imported to "Photoshop". The rule cross-section is divided into left and right sections. Because deformation largely occurs from the top side of the rule, the division is made using a vertical line (having a substantially infinitely small width), drawn up from the middle of the bottom side of the cross-section (i.e., connected to the elongate rule base).

FIG. 19A provides a schematic view of a rule cross-section after being cut to a rectangular profile, according to the standard deformation procedure; FIG. 19B provides a schematic view of this rule cross-section, after concluding the writing portion of the procedure.

The data from Photoshop may be imported into Excel or the like. In the quantification procedure, the number of dark pixels on each side of the vertical division line is counted. In gray scale, "0" is black, and "256" is white. All pixels exceeding a value of 100 were considered to be white. This procedure is repeated for each rule.

With reference again to FIGS. 19A and 19B, the rule on the left side (to the left of the division line) fills only about 55% of the original area filled by the rule (as shown in FIG. 19A); the rule on the right side fills about 145% of the original area filled by the rule. Dividing the larger value (VL) by the smaller value (VS), we obtain the coefficient of deformation, CD:

$$CD = VL/VS = 145\%/55\% = 2.64.$$

In the present invention, the coefficient of deformation (CD) may be at most 1.8, at most 1.6, at most 1.4, at most 1.3, at most 1.2, at most 1.15, at most 1.1, at most 1.08, at most 1.06, at most 1.04, or at most 1.02.

Another way of characterizing the rule quality is to evaluate the creasing quality of the rule subsequent to the standard deformation procedure. The creasing quality may be evaluated using commercially available folding-force measuring equipment. In the procedure and evaluations provided hereinbelow, creasing quality was evaluated using a Thwing Albert device (Model: 1270-2000 PCA Score Bend/Opening Force Tester), at a bending speed of 309 mm/min. The device measures the folding force for every 1 degree of folding, until a folding angle of 90 degrees has been achieved. In this standard test, the maximum force applied is the measured folding force. The experiment is repeated on two standard creases produced by each rule being tested (and more preferably, on 5 creases), for statistical purposes. The values obtained are normalized by dividing by the mean folding force required for uncreased sheets of the identical cardboard, and converting to percentage form, to obtain the mean folding force ratio.

As used herein in the specification and in the claims section that follows, the term "standard crease" refers to the crease made by a rule after the rule has completed the standard deformation procedure, according to the creasing parameters delineated within that procedure.

The results for rules produced from the formulations of Examples 1, 9, 7, 4, 2 and 6 (as shown in FIG. 18) are provided in the table below, and are provided graphically in FIG. 20.

| Resin | Pressure Depth [mm] | Folding Force [g] | Folding Force Ratio (%) |
| --- | --- | --- | --- |
| Reference | — | 164 | 100 |
| Reference | — | 169 | 100 |
| Reference | — | 167 | 100 |
| Example 1 | 1 | 151 | 90.6 |
| Example 1 | 1 | 150 | 90 |
| Example 9 | 1 | 98 | 58.8 |
| Example 9 | 1 | 101 | 60.6 |
| Example 7 | 1 | 97 | 58.2 |
| Example 7 | 1 | 97 | 58.2 |
| Example 4 | 1 | 93 | 55.8 |
| Example 4 | 1 | 95 | 57 |
| Example 2 | 1 | 115 | 69 |
| Example 2 | 1 | 119 | 71.4 |
| Example 6 | 1 | 90 | 54 |
| Example 6 | 1 | 90 | 54 |

Rules of the present invention may have a mean folding force ratio of at most 65%, at most 63%, at most 61%, at most 60%, at most 59%, at most 58%, at most 57%, at most 56%, at most 55%, or at most 54%. Typically, the folding force ratio is at least 40%, at least 45%, at least 48%, at least 50%, at least 51%, at least 52%, or at least 53%.

Figure 21:
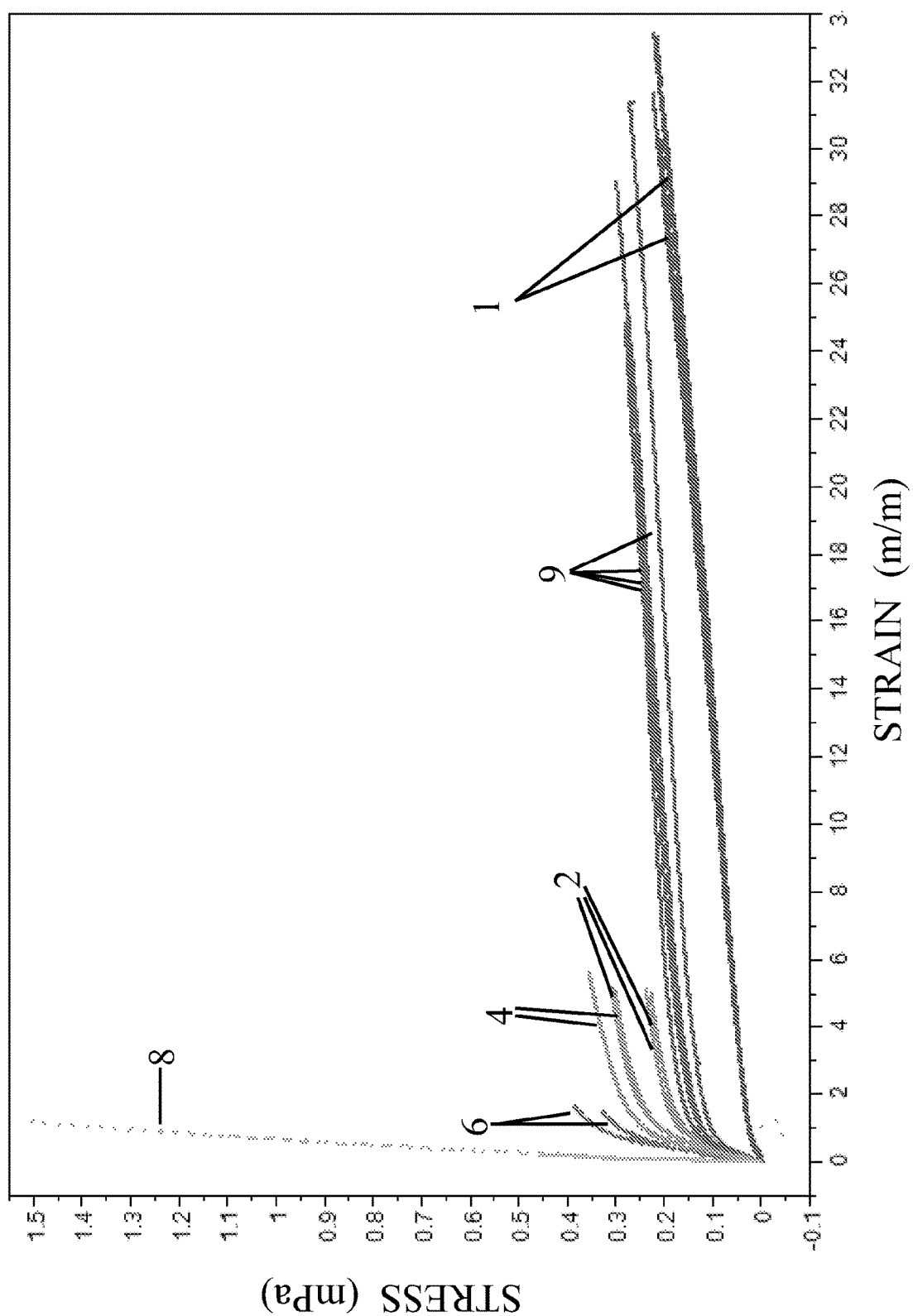
FIG. 21 is a stress-strain plot for various formulations (Examples 1, 2, 4, 6, 8, and 9) cured according to the standard curing procedure of Example 13 to produce cured (rule) materials having the requisite (ASTM 638-03) shape and dimensions.

FIG. 21 is a stress-strain plot for various formulations (Examples 1, 2, 4, 6, 8, and 9) cured according to the standard curing procedure of Example 13 to produce cured (rule) materials having the requisite (ASTM 638-03) shape and dimensions. These materials were subjected to stress-strain testing, using an Instron 4481 tensile machine. The crosshead speed was 1.0 mm/min, the second crosshead speed was 10 mm/min, and the full-scale load range was 5 kN.

Numerical values for various stress-strain parameters: stress at yield, strain at yield, stress at maximum load, strain at break, Young's modulus, and energy to break point are provided in the table below:

| Example Number | Stress at yield (MPa) | Strain at yield (%) | Stress at max. load (MPa) | Strain at break (%) | Young's Modulus (MPa) | Energy to break point (J) |
|---|---|---|---|---|---|---|
| 9 | 2.7 | 1.8 | 9.5 | 111.1 | 166.6 | 5.9 |
| 1 | — | — | 6.8 | 129.1 | 16.3 | 3.8 |
| 7 | 3.5 | 0.67 | 8 | 2.2 | 772.7 | 0.06 |
| 4 | 3.2 | 1.3 | 10.3 | 20.8 | 326.6 | 1.2 |
| 2 | 1.9 | 0.76 | 9.1 | 20.9 | 352.1 | 1.1 |
| 3 | 2.6 | 0.65 | 9.1 | 5.1 | 591.1 | 0.26 |
| 8 | | | 47.7 | 3.67 | | |

From the data: the formulations according to the present invention, when cured according to the standard curing procedure, and prepared in accordance with the procedure provided in Example 13, and tested in accordance with the "standard tensile test" described hereinabove, may exhibit a stress at yield of at least 1.5, 1.7, 1.9, 2.1, 2.3, or 2.5 MPa.

The stress at yield may be at most 5, 4.5, 4, 3.5, or 3.3 MPa.

Similarly, the formulations according to the present invention, when cured according to the standard curing procedure, and prepared in accordance with the procedure provided in Example 13, may exhibit a strain at yield of at least 0.2, at least 0.4, at least 0.5, or at least 0.6%.

This strain at yield may be at most 1.6, at most 1.5, at most 1.4, at most 1.3, at most 1.2, at most 1.1, or at most 1.0%.

Young's modulus, for the inventive formulations cured according to the standard curing procedure, and prepared in accordance with the procedure provided in Example 13, may be at least 300, at least 325, at least 350, at least 375, at least 400, or at least 425 MPa.

This Young's modulus may be at most 700, at most 650, at most 600, at most 575, or at most 550 Mpa.

The stress at maximum load, for the inventive formulations cured according to the standard curing procedure, and prepared in accordance with the procedure provided in Example 13, may be at least 3, at least 4, at least 6, at least 7, or at least 8 MPa.

This stress at maximum load may be at most 25, at most 20, at most 16, at most 14, or at most 12 MPa.

With regard to the break point: the strain at break, for the inventive formulations cured according to the standard curing procedure, and prepared in accordance with the procedure provided in Example 13, may be at least 3, at least 3.5, at least 4, at least 4.5, at least 5, at least 6, at least 7, or at least 8%.

This strain at break may be at most 50, at most 40, at most 35, at most 30, at most 25, at most 20, at most 15, at most 12, or at most 10%.

The cumulative energy to this break point may be at least 0.15, at least 0.2, or at least 0.25 J. This cumulative energy may be at most 1.5, at most 1.3, at most 1.2, at most 1.1, at most 1.0, at most 0.9, at most 0.8, at most 0.7, at most 0.6, at most 0.5, or at most 0.4 J.

With regard to rule hardness, the hardness of each rule was evaluated according to the following procedure:

The rule was cured, and the sample was dimensioned, according to the standard procedure provided in Example 13. The sample size was 180·30·2 mm$^3$.

Figure 22:
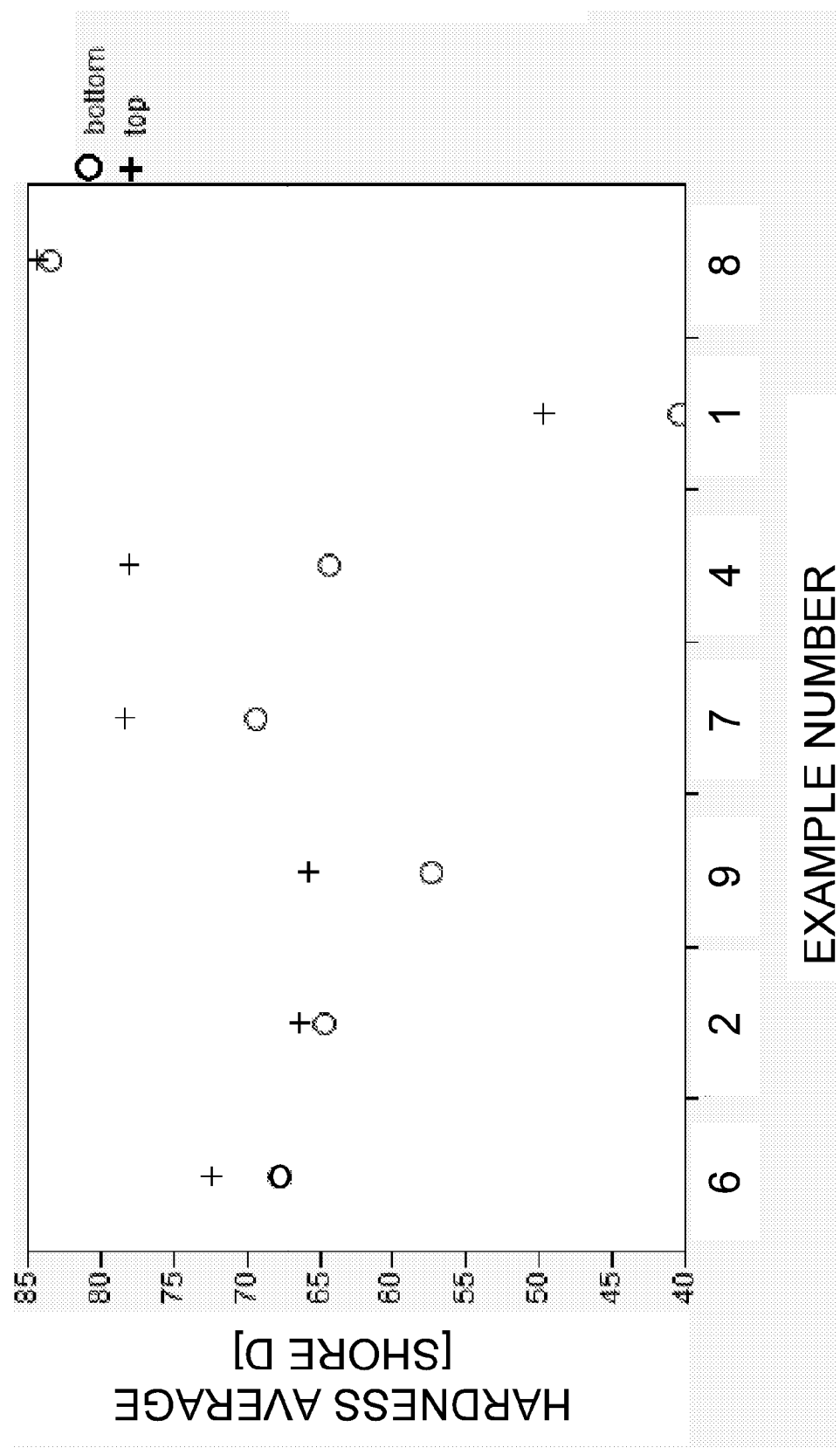
FIG. 22 plots the average Shore D hardness of the tops (contact surface) and bottoms of rules produced from the formulations of Examples 1, 9, 7, 4, 2 and 6.

The needle of the hardness-measuring device (Bareiss Germany, HP) was pressed on the top and bottom sides of the sample at three random locations for each side, to obtain the average Shore D hardness. Results are provided in the table below, and are plotted in FIG. 22.

As used herein in the specification and in the claims section that follows, the term "proximate to the die surface" and the like, with respect to a rule width, refers to a maximum width of the rule within 2 mm of the rule "tip", distal to the die base.

As used herein in the specification and in the claims section that follows, the term "percent", or "%", refers to percent by weight, unless specifically indicated otherwise.

As used herein in the specification and in the claims section that follows, the term "acrylate" is specifically meant to include sub-species of the acrylate family, including methacrylates and acrylates having a single acrylate moiety, or more than one moiety.

| Example Number | place of measurement on sample | hardness (measurement 1) [Shore D] | hardness (measurement 2) [Shore D] | hardness (measurement 3) [Shore D] | average hardness [Shore D] |
|---|---|---|---|---|---|
| 1 | top | 51 | 49 | 49 | 49.7 |
| 9 | top | 67 | 65 | 65 | 65.7 |
| 7 | top | 80 | 80 | 75 | 78.3 |
| 8 | top | 83 | 85 | 85 | 84.3 |
| 4 | top | 79 | 80 | 75 | 78 |
| 2 | top | 66 | 67 | 66 | 66.3 |
| 6 | top | 78 | 68 | 71 | 72.3 |
| 1 | bottom | 41 | 41 | 39 | 40.3 |
| 9 | bottom | 60 | 58 | 54 | 57.3 |
| 7 | bottom | 71 | 67 | 70 | 69.3 |
| 8 | bottom | 84 | 85 | 81 | 83.3 |
| 4 | bottom | 66 | 67 | 60 | 64.3 |
| 2 | bottom | 67 | 63 | 64 | 64.7 |
| 6 | bottom | 65 | 69 | 69 | 67.7 |

The term "acrylic", with respect to a moiety, is specifically meant to include the various sub-species of the acrylic moiety, including methacrylic moieties.

As used herein in the specification and in the claims section that follows, the term "standard curing procedure", and the like, refers to the formulation curing procedure detailed in Example 13.

As used herein in the specification and in the claims section that follows, the term "standard tensile test" refers to a stress-strain test on samples prepared in accordance to ASTM 638-03, using an Instron 4481 (or equivalent) tensile machine, under the following conditions: crosshead speed: 1.0 mm/min; second crosshead speed: 10 mm/min, and full-scale load range: 5 kN. It may be appreciated by those of skill in the art that different operating conditions might be suitable for samples having different mechanical properties.

As used herein in the specification and in the claims section that follows, the term "strain-stress properties" refer to those properties characterized using the "standard tensile test".

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification, including U.S. Pat. Nos. 3,470,773 and 7,670,275, and U.S. Patent Publication No. 20120129672, are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A pre-polymeric formulation for producing a rule die by pressure dispensation via an orifice, the formulation comprising:
   (a) at least one pre-polymer;
   (b) a photoinitiator selected to polymerize said pre-polymer; and
   (c) a thickening agent;
   said photoinitiator and said thickening agent being mixed with said pre-polymer, the formulation having the following rheological properties at 25° C.:
   (i) $G'_{rest} > 3,000$ Pascal (Pa);
   (ii) G' exhibits a value of at least 2,500 Pa after being subjected to an oscillation stress of 300 Pa for 20 seconds, within 7 seconds of an abrupt relaxation of said stress,
   G' being a storage modulus of the formulation;
   $G'_{rest}$ being a storage modulus of the formulation at a pressure of 40 Pa, at rest;
   said thickening agent including an amorphous silica, a concentration of said amorphous silica within the formulation being within a range of 3% to 32%, by weight;
   said pre-polymer comprising at least one monomer or oligomer, said at least one monomer or oligomer having at least one functional moiety selected from the group consisting of acrylic, vinyl, thiol, and epoxy moieties,
   wherein, when a cured formulation is obtained by standard curing of the pre-polymeric formulation, said cured formulation has the following strain-stress (ε-σ) properties at 25°C.:
   (i) a Young's modulus within a range of 290 to 710 MPa; and
   (ii) a strain at break within a range of 13 to 30%.

2. The formulation of claim 1, said concentration of said amorphous silica within the formulation being within a range of from 5% to 32% by weight.

3. The formulation of claim 1, said concentration of said amorphous silica within the formulation being within a range of 3% to 23% by weight.

4. The formulation of claim 1, said concentration of said amorphous silica within the formulation being within a range of 7% to 22%.

5. The formulation of claim 1, the formulation comprising 6% to 18% tricyclodecane dimethanol diacrylate.

6. The formulation of claim 1, the formulation comprising 15% to 60% isobornyl acrylate.

7. The formulation of claim 1, the formulation comprising 5% to 34% of at least one methacrylate.

8. The formulation of claim 1, the formulation comprising 35% to 88% of at least one methacrylate.

9. A method of writing a pre-polymeric formulation on a substrate, to produce a polymeric rule die, the method comprising:
   (a) providing a pre-polymeric formulation in a canister; said formulation comprising:
      (i) at least one pre-polymer;
      (ii) a photoinitiator selected to polymerize said pre-polymer; and
      (iii) a thickening agent;
   (b) extruding the formulation from said canister onto the substrate, to form at least one uncured elongate rule; and
   (c) curing said uncured elongate rule on the substrate to form the polymeric rule die, the rule die including at least one cured elongate rule having a length of at least 5 mm;
   said pre-polymeric formulation in said canister containing a sufficiently low gas concentration, such that over a total length of a contact surface of said cured elongate rule, said contact surface has at most 3 surface pocks/meter, said surface pocks having a diameter above 0.1 mm.

10. The method of claim 9, wherein, over a total length of said cured elongate rule, a bubble content of bubbles having a diameter above 0.4 mm is at most 2 bubbles/meter.

11. A pre-polymeric formulation for producing a rule die by pressure dispensation via an orifice, the formulation comprising:
   (a) at least one pre-polymer;
   (b) a photoinitiator selected to polymerize said pre-polymer; and
   (c) a thickening agent;
   said photoinitiator and said thickening agent being mixed with said pre-polymer, the formulation having the following rheological properties at 25° C.:

(i) $G'_{rest}$ >3,000 Pascal (Pa);

(ii) G' exhibits a value of at least 2,500 Pa after being subjected to an oscillation stress of 300 Pa for 20 seconds, within 7 seconds of an abrupt relaxation of said stress, G' being a storage modulus of the formulation;

$G'_{rest}$ being a storage modulus of the formulation at a pressure of 40 Pa, at rest;

said thickening agent including an amorphous silica, a concentration of said amorphous silica within the formulation being within a range of 3% to 32%, by weight;

said monomer or said oligomer having at least one functional moiety selected from the group consisting of acrylic, vinyl, thiol, and epoxy moieties wherein, when a cured formulation is obtained by standard curing of the formulation, said cured formulation has, at 25° C., a Young's modulus of at least 300 MPa, and a Shore D hardness of at least 55.

12. The pre-polymeric formulation of claim 11, wherein said Shore D hardness is at least 60.

13. The pre-polymeric formulation of claim 11, wherein said Shore D hardness is at least 55 and at most 90.

14. The pre-polymeric formulation of claim 12, wherein said Shore D hardness is at least 55 and at most 88.

* * * * *